US010969989B2

(12) United States Patent
Tylik et al.

(10) Patent No.: US 10,969,989 B2
(45) Date of Patent: Apr. 6, 2021

(54) TECHNIQUES FOR CAPTURING VIRTUAL MACHINE SNAPSHOTS USING DATA STORAGE SYSTEM SNAPSHOTS

(71) Applicant: EMC IP Holding Company LLC, Hopkinton, MA (US)

(72) Inventors: Dmitry Tylik, Westborough, MA (US); Michael Zeldich, Newton, MA (US); Nagasimha G. Haravu, Apex, NC (US); William C. Whitney, Marlborough, MA (US); Sergey Alexeev, Saint Petersburg (RU); Alexey Shusharin, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/525,921

(22) Filed: Jul. 30, 2019

(65) Prior Publication Data
US 2021/0034245 A1 Feb. 4, 2021

(51) Int. Cl.
*G06F 3/06* (2006.01)
*G06F 9/455* (2018.01)

(52) U.S. Cl.
CPC ............ *G06F 3/065* (2013.01); *G06F 3/0619* (2013.01); *G06F 3/0659* (2013.01); *G06F 3/0664* (2013.01); *G06F 3/0673* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| 9,223,659 | B1* | 12/2015 | Natanzon | G06F 11/1456 |
| 9,588,847 | B1* | 3/2017 | Natanzon | G06F 11/1453 |
| 2007/0244938 | A1* | 10/2007 | Michael | G06F 16/128 |
| 2011/0252208 | A1* | 10/2011 | Ali | G06F 11/1451 |
| | | | | 711/162 |
| 2013/0262801 | A1* | 10/2013 | Sancheti | G06F 3/0619 |
| | | | | 711/162 |
| 2015/0242283 | A1* | 8/2015 | Simoncelli | G06F 11/1456 |
| | | | | 711/162 |
| 2017/0286230 | A1* | 10/2017 | Zamir | G06F 9/45558 |
| 2019/0317867 | A1* | 10/2019 | Yadav | G06F 9/45558 |
| 2020/0110675 | A1* | 4/2020 | Wang | G06F 9/45558 |

* cited by examiner

*Primary Examiner* — Edward J Dudek, Jr.
*Assistant Examiner* — Ralph A Verderamo, III
(74) *Attorney, Agent, or Firm* — Muirhead and Saturnelli, LLC

(57) ABSTRACT

Techniques for taking and managing snapshots comprise: capturing a first snapshot of a virtual machine (VM), wherein the first snapshot is a managed snapshot exposed to a virtualization environment and a data storage system environment providing physical storage for data of the VM; capturing a second snapshot of the VM, wherein the second snapshot of the VM is a managed snapshot of the VM is exposed to the virtualization environment and the data storage system environment; and converting the second snapshot of the VM from a managed snapshot of the VM to an unmanaged snapshot of the VM. Subsequent to completing the converting, the second snapshot of the VM that is an unmanaged snapshot is exposed to the data storage system environment and subsequent to completing the converting, the second snapshot of the VM that is an unmanaged snapshot is not exposed to the virtualization environment.

20 Claims, 16 Drawing Sheets

TECHNIQUES FOR CAPTURING VIRTUAL MACHINE SNAPSHOTS USING DATA STORAGE SYSTEM SNAPSHOTS

BACKGROUND

Technical Field

This application generally relates to data storage and, more particularly, to snapshot techniques used in connection with a data storage system and a virtualized environment.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for taking and managing snapshots. Processing performed includes capturing a first snapshot of a virtual machine (VM), wherein the first snapshot of the VM is a managed snapshot of the VM exposed to a virtualization environment including the VM and wherein the first snapshot of the VM is also exposed to a data storage system environment providing physical storage for data of the VM; capturing a second snapshot of the VM, wherein the second snapshot of the VM is a managed snapshot of the VM exposed to the virtualization environment and wherein the second snapshot of the VM is also exposed to the data storage system environment; and converting the second snapshot of the VM from a managed snapshot of the VM to an unmanaged snapshot of the VM, wherein subsequent to completing said converting, the second snapshot of the VM that is an unmanaged snapshot is exposed to the data storage system environment and wherein subsequent to completing said converting, the second snapshot of the VM that is an unmanaged snapshot is not exposed to the virtualization environment. The first snapshot of the VM may use a first set of VM configuration information describing a current configuration of the VM at a first point in time when capturing the first snapshot of the VM, and wherein the second snapshot of the VM may use a second set of VM configuration information describing a current configuration of the VM at a second point in time when capturing the second snapshot of the VM.

In at least one embodiment, the first set of VM configuration information and the second set of VM configuration information match. The processing may include receiving a request to restore the VM to the second snapshot of the VM; and responsive to receiving the request, converting the second snapshot of the VM from an unmanaged snapshot of the VM to a managed snapshot of the VM. The VM may use a plurality of virtual volumes (VVOLs) including a first VVOL. The first snapshot of the VM may include a first snapshot of the first VVOL, and the second snapshot of the VM may include a second snapshot of the first VVOL. Converting the second snapshot of the VM from an unmanaged snapshot of the VM to a managed snapshot of the VM may include copying the second snapshot of the first VVOL included the second snapshot of the VM to the first snapshot of the first VVOL included in the first snapshot of the VM; and subsequent to said copying, requesting that the virtualization environment restore the VM from first snapshot of the VM including the second snapshot of the first VVOL. The first snapshot of the VM and the second snapshot of the VM may be included in a same family or generation of snapshots of the VM, wherein each snapshot of the VM included in the same family or generation of snapshots of the VM may use a same set of VM configuration information. The first set of VM configuration information may include information identifying resources allocated for use by the VM at the first point in time when the first snapshot of the VM is captured. The second set of VM configuration information may include information identifying resources allocated for use by the VM at the second point in time when the second snapshot of the VM is captured. Each of the first set of VM configuration information and the second set of VM configuration information may include information identifying at least one of: a number of processors allocated for use by the VM, an amount of memory allocated for use by the VM, a number of VVOLs used by the VM, one or more VVOLs used by the VM, ports or communication connections used by the VM. The resources allocated for use by the VM at the first point in time may be from a host upon which the VM is running at the first point in time, and wherein the resources allocated for use by the VM at the second point in time may be from a host upon which the VM is running at the second point in time.

In at least one embodiment, the first set of VM configuration information and the second set of VM configuration information may not match. The processing performed may include receiving a request to restore the VM to the second snapshot of the VM, wherein the second snapshot of the VM is an unmanaged snapshot of the VM; responsive to receiving the request, converting the second snapshot of the VM from an unmanaged snapshot of the VM to a second managed snapshot of the VM, wherein the second managed snapshot of the VM is exposed to the virtualization environment and the data storage system environment; and issuing a request to the virtualization environment to restore the VM from the second managed snapshot. The converting may be performed responsive to determining that a current number of managed snapshots is equal to a maximum number of allowable managed snapshots of the VM, wherein the maximum number is a limitation imposed by the virtualization environment and not a limitation imposed by the data storage system environment. The processing may include receiving, at the data storage system environment from the virtualization environment, the second set of VM configuration information; storing, in the data storage system environment, the second set of VM configuration information, wherein the second set of VM configuration information is associated with the second snapshot of the VM; receiving, at the data storage system environment, a request to restore the VM to the second snapshot of the VM when the second snapshot of the VM is an unmanaged snapshot not visible to the virtualization environment; issuing a request from the data storage system environment to the virtualization environment to instantiate the second snapshot of the VM as a managed snapshot exposed to the virtualization environment; and issuing a request from the data storage system environment to the virtualization environment to restore the VM from the second snapshot of the VM when the second snapshot is a managed snapshot exposed to the virtualization environment. The second snapshot of the VM may include a snapshot of a VVOL used by the VM. The request, that is issued from the data storage system environment to the virtualization environment to restore the VM from the second snapshot of the VM, may include the second set of VM configuration information and the snapshot of the VVOL used by the VM. The virtualization environment may issue a request to the data storage system to create the snapshot of the VVOL used by the VM.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
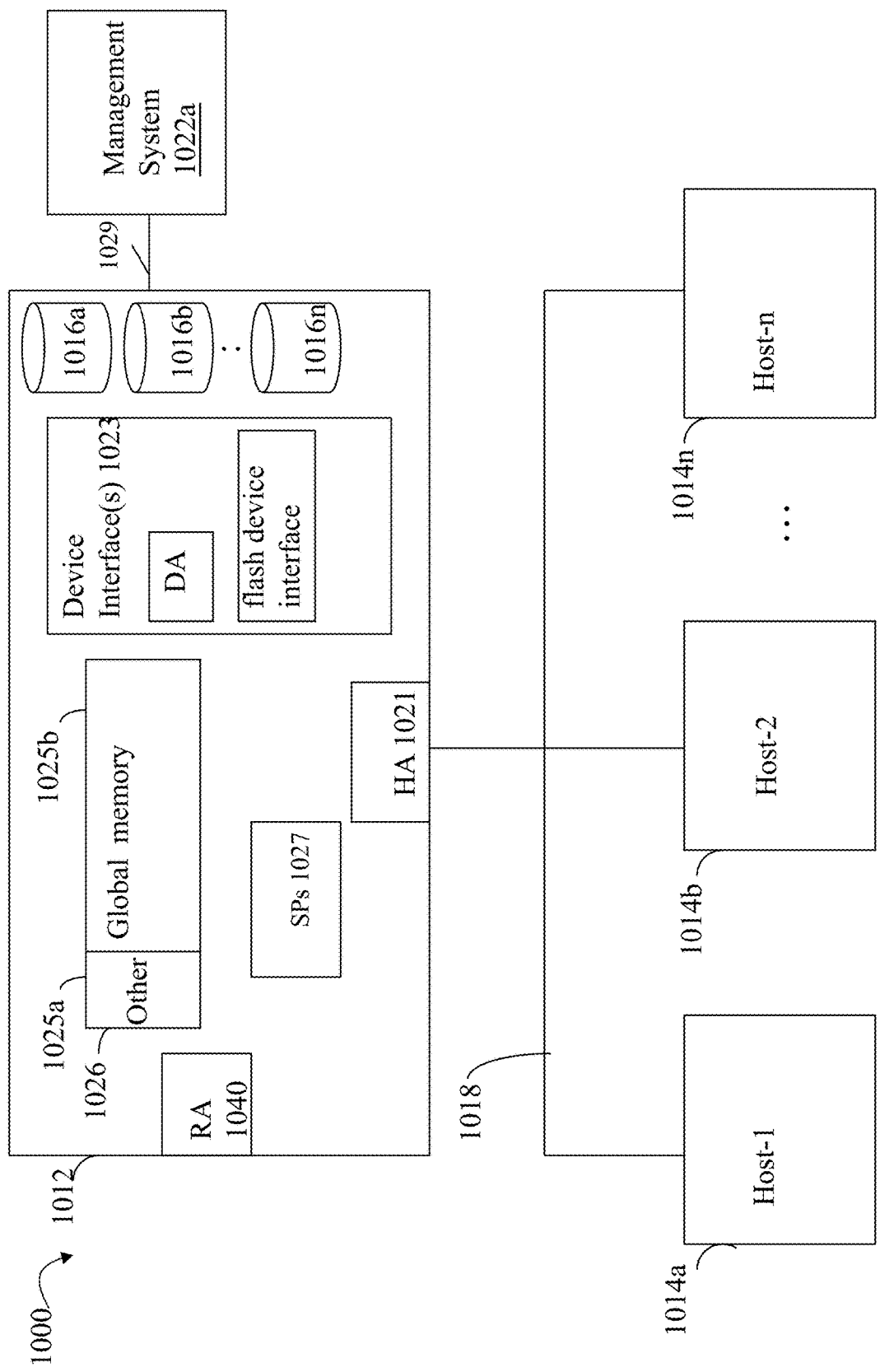
FIGS. 1 and 2 are examples of components that may be included in systems in accordance with techniques described herein.

Referring to the FIG. 1, shown is an example of an embodiment of a system 1000 that may be used in connection with performing the techniques described herein. The system 1000 includes a data storage system 1012 connected to the host systems (also sometimes referred to as hosts) 1014a-1014n through the communication medium 1018. In this embodiment of the system 1000, the n hosts 1014a-1014n may access the data storage system 1012, for example, in performing input/output (I/O) operations or data requests. The communication medium 1018 may be any one or more of a variety of networks or other type of communication connections as known to those skilled in the art. The communication medium 1018 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 1014a-1014n may access and communicate with the data storage system 1012, and may also communicate with other components included in the system 1000.

Each of the host systems 1014a-1014n and the data storage system 1012 included in the system 1000 may be connected to the communication medium 1018 by any one of a variety of connections as may be provided and supported in accordance with the type of communication medium 1018. The processors included in the host systems 1014a-1014n and data storage system 1012 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 1012 are described herein in more detail, and may vary with each particular embodiment. Each of the hosts 1014a-1014n and the data storage system 1012 may all be located at the same physical site, or, alternatively, may also be located in different physical locations. The communication medium 1018 used for communication between the host systems 1014a-1014n and the data storage system 1012 of the system 1000 may use a variety of different communication protocols such as block-based protocols (e.g., SCSI, Fibre Channel, iSCSI, Non-volatile Memory Express (NVMe) and NVMe over Fabrics (NVMe-oF)), file system-based protocols (e.g., NFS), and the like. Some or all of the connections by which the hosts 1014a-1014n and the data storage system 1012 may be connected to the communication medium 1018 may pass through other communication devices, such switching equipment that may exist such as a phone line, a repeater, a multiplexer or even a satellite.

Each of the host systems 1014a-1014n may perform data operations. In the embodiment of the FIG. 1, any one of the host computers 1014a-1014n may issue a data request to the data storage system 1012 to perform a data operation. For example, an application executing on one of the host computers 1014a-1014n may perform a read or write operation resulting in one or more data requests to the data storage system 1012.

It should be noted that although element 1012 is illustrated as a single data storage system, such as a single data storage array, element 1012 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 1012 may be a data storage appliance or a data storage array including a plurality of data storage devices (PDs) 1016a-1016n. The data storage devices 1016a-1016n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 1021 (host adapter), RA 1040 (remote adapter), and/or device interface or controller 1023. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 1021 may be characterized as a front end component of the data storage system which receives a request from one of the hosts 1014a-n. The data storage array may include one or more RAs that may be used, for example, to facilitate communications between data storage arrays. The data storage array may also include one or more device interfaces 1023 for facilitating data transfers to/from the data storage devices 1016a-1016n. The data storage device interfaces 1023 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 1023, the RAs 1040, the HAs 1021, and the memory 1026. An embodiment, for example, may use one or more internal busses and/or communication modules. For example, the global memory portion 1025b may be used to facilitate data transfers and other communications between the device interfaces, HAs and/or RAs in a data storage array. In one embodiment, the device interfaces 1023 may perform data operations using a system cache that may be included in the global memory 1025b, for example, when communicating with other device interfaces and other components of the data storage array. The other portion 1025a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 1014a-1014n provide data and access control information through channels to the storage systems 1012, and the storage systems 1012 may also provide data to the host systems 1014a-n also through the channels. The host systems 1014a-n do not address the drives or devices 1016a-1016n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 1022a that may be used to manage and monitor the data storage system 1012. In one embodiment, the management system 1022a may be a computer system which includes data storage system management software or application such as may execute in a web browser. A data storage system manager may, for example, view information about a current data storage configuration such as LUNs, storage pools, and the like, on a user interface (UI) in a display device of the management system 1022a. Alternatively, and more generally, the management software may execute on any suitable processor in any suitable system. For example, the data storage system management software may execute on a processor of the data storage system 1012.

It should be noted that each of the different adapters, such as HA, DA, RA, and the like, may be implemented as a hardware component including, for example, one or more processors, one or more forms of memory, and the like. Code may be stored in one or more of the memories of the component for performing processing.

The device interface or backend device controller, such as a DA, performs I/O operations on a physical device or drive 1016a-1016n. In the following description, data residing on a LUN may be accessed by the device interface following a data request in connection with I/O operations. For example, a host may issue an I/O operation which is received by the HA 1021. The I/O operation may identify a target location from which data is read from, or written to, depending on whether the I/O operation is, respectively, a read or a write operation request. In connection with block-based protocols, the target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 1012 of the FIG. 1 may be a data storage system, such as a data storage array, that includes multiple storage processors (SPs). Each of the SPs 1027 may be a CPU including one or more "cores" or processors and each may have their own memory used for communication between the different front end and back end components rather than utilize a global memory accessible to all storage processors. In such embodiments, the memory 1026 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control or management commands may be issued from data storage management software executing on management system 1022a to the data storage system 1012. Such commands may be, for example, to establish or modify data services, provision storage, perform user account management, and the like. For example, commands may be issued over the control path to provision storage for LUNs or file systems, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data or I/O path and the control or management path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 1029 from a management system 1022a to the data storage system 1012 being managed whereby control commands may be issued over such a physical connection 1029. However, it may be that user I/O commands are never issued over such a physical connection 1029 provided solely for purposes of connecting the management system to the data storage system. Different logical call stacks or chains of code entities (e.g., routines, functions) invoked at runtime may be different for the data or I/O path and the control or management path. In any case, the data or I/O path and the control or management path each define two separate logical flow paths.

An embodiment of a data storage system in accordance with techniques herein may perform different data processing operations or services on stored data. For example, in at least one embodiment in accordance with the techniques herein, a data storage system may provide different data replication technologies, facilities or services. Such replication technologies may be characterized as local or remote. Additionally, a replication technology may provide for creating a complete, physical bit for bit copy or replica of data (that is local and/or remote). A replication technology may provide for creating a logical or virtual point in time copy of a data source such as using a snapshot technology or facility known in the art. Such logical copies of a data source are not a complete physical copy of the data source. Rather, different techniques such as a snapshot technique may be used to create a logical or virtual copy of the data source. For example, a snapshot facility may be used in an embodiment in accordance with techniques herein to create a snapshot characterized as a logical point in time copy of data. In connection with a logical device, or more generally any storage entity, software of a data storage system may provide one or more data replication services or facilities whereby a snapshot is one such facility that may be used to create point in time snapshot of a logical device such as a LUN for non-disruptive backup. A snapshot may appear like a normal logical device and may be used for backup, testing, and the like.

Snapshots may rely, for example, on copy on first write (COFW) and other techniques to track source logical device (or more generally source storage object) changes from the time when a snapshot was created. Any writes to the source logical device or source object may result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device or object. Since only changed data blocks of the source device are retained rather than make a complete copy of the source device or object, the storage capacity required to implement snapshots may be considerably less than that of the source device or object. Though a snapshot of a source logical device or object may be presented to a user as a separate logical device or object along with the current source logical device or object, a snapshot of the source logical device or object is a virtual point in time copy and requires access to the unchanged data in the source logical device or object. Therefore failures affecting the source logical device or object also affect the snapshot of the source logical device or object. Snapshots of a source logical device or object may be contrasted, for example, with the physically complete bit-for-bit replicas of the source logical device or object.

In connection with the foregoing, COFW is only one example of a technology or a technique that may be used in connection with snapshots. More generally, any suitable technique may be used in connection with snapshot creation and the techniques described herein. As another example, redirect on Write (ROW) is another technique that may be used in connection with a snapshot implementation. With ROW, after a snapshot is taken, new writes to the primary or source logical device or object are redirected (written) to a new location.

In some cases, hosts or client systems may have virtualized environments whereby virtual machines (VMs) execute on the hosts. Software may be used to manage the virtualized environments including the VMs. For example, in at least one embodiment, VMware vSphere® may be used to serve as a complete platform for implementing and managing the VM infrastructure. For example, in at least one embodiment, the virtualization environment uses VMware vSphere®, where VMware vSphere® includes the VMware ESX® or VMware ESXi™ hypervisor that functions as the virtualization server; the VMware vCenter Server®, which manages vSphere® environments; the VMware vSphere® Client, which is used to install and manage virtual machines through the hypervisor; and VMware vSphere® VMFS, the file system component from VMware, Inc.

Data used in such virtualized environments may be stored on a data storage system. The virtualized environment may have support for capturing or taking snapshots. For example, when using VMware vSphere® as the virtualized environment, snapshots may be captured at the data store level of granularity where each such data store (e.g., each VMFS (virtual machine file system) data store) may include data used by multiple VMs. In at least one existing system using VMware vSphere® as the virtualized environment, a snapshot of a single VM may also be captured. However, in such a system there may be a maximum limit of 32 snapshots per VM. Additionally, a data storage system may also have its own snapshot data storage service or technology that is independent of any snapshot facility or service of the virtualized environment. The data storage system may have different maximum limits and supported granularities of capturing snapshots. For example, the data storage system may allow a maximum number of snapshots, such as 256, that exceeds the maximum limit, such as 32 of the virtualization environment. In at least one implementation where the virtualization environment is integrated with a data storage system, the data storage system may support taking snapshots at the virtual disk or volume (VVOL) level. A VVOL or virtual disk may be a single logical device used in connection with a VM whereby a single VM typically stores it data on multiple VVOLs or virtual disks. Thus, in such an integrated system, the virtualization environment may support a maximum number of snapshots per VM, such as 32, and the data storage system may support a different number of snapshots at the VVOL level of granularity.

In at least one embodiment in accordance with the techniques herein, the virtualization environment may use different terminology than the data storage system to denote various storage entities or objects. For example, in at least one embodiment as described herein, VVOLs is an integration and management framework for external storage that provides finer control at of storage at the VM level. VVOLs are VM granular storage entities exported by data storage systems integrated with the virtualization environment. VVOLs are an object type supported by a virtualization environment, such as vSphere, where a VVOLs are encapsulations of, for example, VM files and virtual disks of the virtualization environment. In at least one embodiment as described herein, VVOLs are exported to the ESXi host through a small set of protocol end-points (PE). Protocol Endpoints are part of the physical storage fabric, and they establish a data path from VMs to their respective VVOLs on demand. Storage systems enable data services on VVOLs. Data services, configuration and management of VVOLs is exclusively done out-of-band with respect to the data path (e.g., done using the management or control path). VVOLs can be grouped into logical entities called storage containers (SC) for management purposes. The existence of storage containers is limited to the out-of-band management channel. For in-band communication over the data or I/O path with data storage systems utilizing VVOLs, vSphere (e.g., the virtualization environment) uses standard SCSI and NFS protocols (e.g., such as when issuing I/Os from applications executing in the context of VMs on hosts). This results in support with VVOLs for any type of storage that includes, for example, iSCSI, Fibre Channel, Fibre Channel over Ethernet (FCoE), and NFS. VVOLs may represent virtual disks of a VM as abstract objects identified by 128-bit GUID, managed by the data storage system. In following paragraphs in at least one embodiment, reference is made to VVOLs consistent with the storage objects or entities as may be used within the data storage system environment, where each VVOL may correspond to a virtual disk or other storage object in the virtualization environment.

Described in following paragraphs are techniques that may be used to provide a per VM level of snapshot protection, where the maximum number of snapshots per VM exceeds the per VM managed snapshot maximum limitation, such as 32, imposed by the virtualization environment. In at least one embodiment where the data storage system supports a larger number of snapshots at a different level of granularity (e.g., 256 snapshots per VVOL or virtual disk), the techniques described in following paragraphs may be used to leverage the larger maximum limit of snapshots (e.g., 256) available using the data storage system technology to provide for a larger number of snapshots per VM rather than be limited by the maximum number of per VM snapshots imposed by the virtualization environment. For example, in at least one embodiment in which the data storage system supports a maximum of 256 snapshots per VVOL and the virtualization environment supports a maximum of 32 snapshots per VM, the techniques in following paragraphs may be used to provide support for capturing and storing an expanded number of snapshots per VM depending on the capabilities of the data storage system. In at least one embodiment, the virtualization environment may leverage the data storage system's snapshot facility in creating a snapshot of a VM.

It should be noted that the details described in connection with embodiments provided to illustrate use of the techniques herein should not be construed as limiting the techniques herein.

Figure 2:
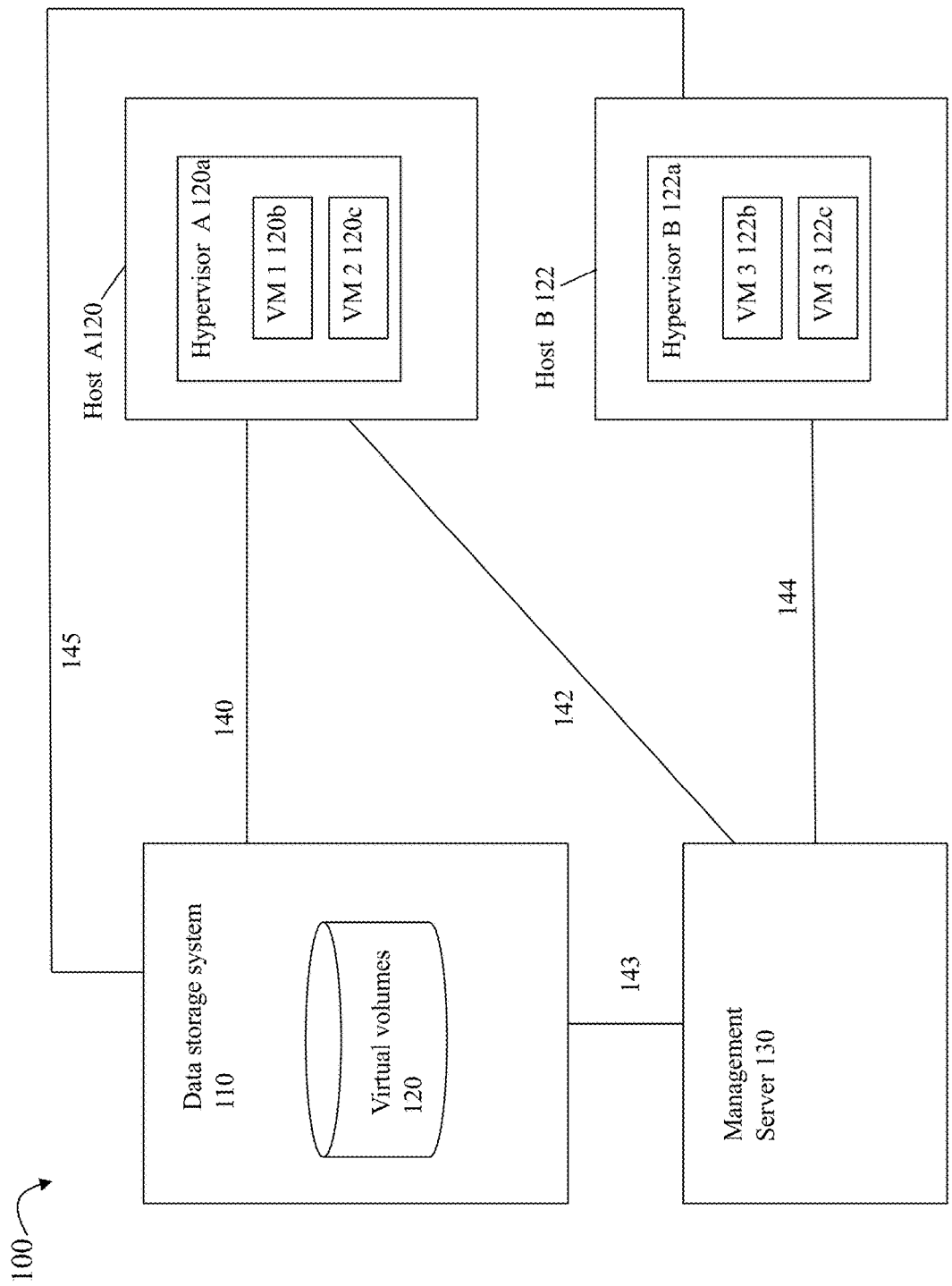

Referring to FIG. 2, shown is an example 100 of components that may be included in an embodiment in accordance with the techniques herein. The example 100 includes data storage system 110, hosts 120 and 122, and management server 130. The host 120 may include hypervisor A 120a managing VMs 120b-c. The host 122 may include hypervisor B 122a managing VMs 122b-c. The management server 130 may be running on a computer system, such as the management system 1022a of FIG. 1. The management server 130 manages the hypervisors 120a, 122b. The data storage system 110 may be as described in connection with FIG. 1 and may store data for the virtual volumes or VVOLs 120 used by the VMs 120b-c and 122b-c. In at least one embodiment, each of the VMs, may use at least 2 VVOLs including a configuration VVOL and one or more data VVOLs. For one of the VMs, such as VM 120b, the configuration VVOL for VM 120b may include configuration data regarding the configuration of the VM 120b. The data VVOL for the VM 120b may store user data, for example, for an application running in the VM 120b. Thus, in the example 100, the VVOLs 120 used by the VMs 120b-c and 122b-c include at least 8 VVOLs. More generally, a VM may use different types of VVOLs other than as described herein for purposes of illustration.

In at least one embodiment using VMware vSphere® as the virtualized or virtualization environment, a first API (application programming interface) may be used as a first management API to issue management commands over the control or management path as described herein. In particular, the first API may be used to issue control or management commands from the data storage system 110 to the management server 130, such as the VMware vCenter Server®, running on a management computer or system.

In such an embodiment, the first API may be the VMware® Infrastructure (VI) API. VMware® Infrastructure SDK (VI SDK). The VI SDK enables developers to create custom solutions for managing VMware® infrastructure components, or integrate existing datacenter management solutions with VMware technologies. In at least one embodiment, the VI SDK API is exposed as a Web service as well as a command line interface. The VI SDK API provides access to the VMware® Infrastructure management components—the managed objects that can be used to manage, monitor, and control life-cycle operations of virtual machines and other VMware® infrastructure components (datacenters, datastores, networks, and so on).

In at least one embodiment, a second API may be used as a second management API to issue management commands over the control or management path. In particular, the second API may be used to issue control or management commands from the hypervisors 120a, 122a, respectively on the hosts 120, 122, to the data storage system 110. In at least one embodiment, the second API may be the VASA (vSphere® API for Storage Awareness) API provided by VMware Inc. The VASA API may be characterized as a vendor neutral API. One portion of the VASA API includes API calls used in connection with the VVOLs that may sometimes be referred to herein as VASA VVOL APIs.

With reference to FIG. 2, the hypervisors 120a, 122a, the VMs 120b-c, 122b-c and the management server 130 may be characterized as components of the virtualization environment which may communicate with the data storage system 110 to store and retrieve data used by virtualization environment. The data storage system 110 may be characterized as included a data storage system environment. Generally, the data storage system environment may include the data storage system 110 in addition to other components such as, for example, data services (e.g., snapshot facility or scheduler) of the data storage system, a user interface of the data storage system or management application of the data storage system, and possibly others.

In connection with various commands described herein, the data storage system 110 may issue a management command using the first API to the management server 130 over connection 143. For example, the data storage system 110 may issue a command to the management server 130 to capture a managed snapshot, as described in more detail elsewhere herein, of one of the VMs, such as VM 120b. In response, the server 130 may communicate (e.g., over connection 142) with the appropriate one of the hypervisors 120a managing the VM 120b to capture the managed snapshot. In response, the hypervisor 120a may issue one or more commands to the data storage system over connection 140, for example, to capture a snapshot of the particular two or more of the VVOLs 120 used by the VM 120b. Generally, the management server 130 may also communicate with the hypervisor 122a over connection 144 as needed to implement various management commands. The hypervisor 122a may communicate with the data storage system 110 over connection 145 as needed to implement various management commands.

In at least one embodiment, elements 140, 142, 143, 144 and 145 of FIG. 2 may denote connections or communication paths used as part of the control or management path in connection with capturing snapshots. Additionally, as may be needed in connection with the applications executing in the context of VMs 120b-c of the host 120 and 122b-c of the host 122, the hosts 120 and 122 may issue I/O operations as part of the I/O or data path over, respectively, connections 140, 145, to the data storage system 110.

In at least one embodiment, the configuration VVOL for a particular one of the VMs 120b-c, 122b-c describes VM state and VM configuration information for the particular VM. For example, the VM configuration VVOL may store VM-level configuration data such as log files, hardware configuration information, resources allocated for use by the VM, information regarding the VVOLs of the VM, information regarding existing snapshots of the VM (as known in the virtualization environment), and the like. In at least one embodiment, the configuration VVOL for a VM may have a one or more files of information regarding the existing managed snapshots known to the virtualization environment.

In at least one embodiment, the VM configuration VVOL may include information regarding the hardware configuration or resources allocated for use by the VM. For example, a VM's configuration VVOL may describe the number of CPUs allocated for use by the VM, the amount of memory allocated for use by the VM, the particular other VVOLs and types of VVOLs used by the VM (e.g., the other data VVOLs used by the VM), the network communications or ports used by the VM, and the like. Thus, as different aspects of the VM configuration as captured by the configuration VVOL may change, the configuration VVOL may be accordingly updated. For example, responsive to creating a new data VVOL used by the VM, deleting an existing data VVOL used by the VM, changing the amount of memory allocated for use by the VM, or changing the number of CPUs allocated for use by the VM, the VM's configuration VVOL may be accordingly updated to reflect the VM configuration or state change.

Snapshots of a VM may preserve the VM configuration and data of the VM at the time each snapshot is taken. In connection with the techniques herein are managed snapshots and unmanaged snapshots. Generally, managed snapshots are at the VM level of granularity and are known, visible, managed and exposed in the virtualization environment. Managed snapshots of the VMs are visible and known to the components of the virtualization environment, such as the management server 130 and hypervisors 120a, 122a.

In at least one embodiment, a single managed snapshot includes a snapshot of the data VVOLs used by the VM. The VVOLs of a single managed snapshot captured for a VM include a consistent set of snapshots of the data VVOLs for the VM. In at least one embodiment, the request to create a snapshot of a VM may be initiated using an interface to the management server 130 of the virtualization environment. As described below in more detail, the management server 130, or more generally, the virtualization environment, may then orchestrate or coordinate taking the managed snapshot of a VM including requesting that the data storage system 110 create a snapshot of each of the data VVOLs associated with a particular VM. The data storage system may track which data VVOL snapshots are associated with which VM and which VM managed snapshot. Additionally, in response to the request received by the management server to create a managed snapshot of a particular VM, the virtualization environment may perform any other processing needed to support creating the managed snapshot of the VM. For example, the management server, or more generally virtualization environment, may save additional information regarding the current configuration of the VM. For example, one or more files describing the VM configuration at the time of taking the managed VM snapshot may be stored on the configuration VVOL of the VM. Thus, in at least one embodiment, creating a managed snapshot of a VM results in the data storage system taking snapshots of the data VVOLs and also results in the virtualization environment saving the additional information regarding the current configuration of the VM. This is described in more detail elsewhere herein.

In contrast to managed snapshots are unmanaged snapshots. Unmanaged snapshots may be characterized as data storage system internal snapshots managed by the data storage system. Unmanaged snapshots of VMs are not known or visible to the virtualization environment. Generally, the data storage system is aware of VVOLs and can take snapshots of individual VVOLs. (e.g., VVOL level of granularity snapshots). In at least one embodiment in accordance with the techniques herein, the data storage system may track and manage which VVOL snapshots should be grouped together as a single unmanaged VM snapshot, where such VVOLs of the group are a consistent set. In at least one embodiment, both managed and unmanaged snapshots at the VM level of granularity may be known and visible to the data storage system. For example, a GUI (graphical user interface) of a management application of the data storage system (e.g., where the management application is not part of virtualization environment) may list, as existing VM level snapshots, collectively both managed and unmanaged snapshots of VMs. In contrast, a GUI of a management application of the virtualization environment may list only the managed snapshots of VMs as VM level snapshots. Furthermore, as discussed below in more detail, the data storage system may track which one or more unmanaged snapshots (visible to the data storage system) of VMs are associated with a particular one of the managed snapshots (visible in the virtualization environment) of a VM.

In at least one embodiment with respect to both managed VM snapshots and unmanaged VM snapshots, the set of data VVOLs included in a single VM snapshot may be either crash consistent or quiesced. Additionally, if quiesced, the data VVOLs of the VM snapshot may be either file system consistent or application consistent. A crash-consistent VM snapshot captures a snapshot of all data VVOLs at the same point in time while preserving write order consistency. This means that the data VVOLs of the VM snapshot contain data consistent with the order in which writes are received at the data storage system. Crash consistency maintained for data VVOLs of the same VM snapshot preserves write order consistency.

However, write order consistency does not guarantee completion of a more complex application level transaction that requires writing to several data VVOLs. Furthermore write order consistency also does not guarantee that all data to be written, such as to various files, has been flushed from cache to physical storage prior to capturing the snapshot. As a result, a VM snapshot may also be a quiesced snapshot. Quiescing is a process of bringing the on-disk data into a state suitable for backups. This quiescing process may include such operations as flushing dirty buffers from the operating system's in-memory cache to disk, or other higher-level application-specific tasks. In at least one embodiment, quiescing may be at the file system level (whereby the snapshot is file system consistent) or quiescing may be at a higher application level (whereby the snapshot is application consistent). Quiescing generally includes temporarily holding or suspending commencement of any new I/Os or other operations that may modify the VVOLs, completing pending I/Os or operations directed to VVOLS, and flushing any cached data (e.g., pending or dirty writes) of the VVOLs to the VVOLs. Quiescing may include preventing new operations from being started and allowing all active/in-progress/pending operations to complete or otherwise back out such pending operations. When a VM is quiesced using VMware® vSphere, VMware® Tools quiesce the file system of the VM. A quiesce operation ensures that snapshot of VVOLs captured represents a consistent state of the guest file systems. When quiescing at the application level, a further level of consistency processing is performed so that operations are completed atomically at the application level transaction, such as writing to multiple VVOLs. With application level consistent snapshots, it is never the case that only a portion of the multiple writes comprising a single application transaction are applied. With application level consistency maintained for a snapshot, the snapshot either has all writes of the single application transaction applied to the multiple VVOLs, or none of the writes of the single application transaction are applied to the multiple VVOLs. In at least one embodiment, when a snapshot of a VM is quiesced, whether the resulting snapshot of the VM is file system consistent or application consistent depends on the particular VM configuration.

In at least one embodiment in accordance with the techniques herein where the virtualization environment does not support more than a specified number of VM level snapshots, such as 32, and where the data storage system supports a much higher number of VVOL level snapshots, such as 256, the techniques herein may be utilized to convert managed VM snapshots into unmanaged VM snapshots, and also to convert unmanaged VM snapshots to managed VM snapshots as needed. In such an embodiment, there may be no more than 32 managed snapshots of a VM but there may be additional unmanaged snapshots of the VM as may be supported by the data storage system. An unmanaged snapshot of a VM may be converted to a managed snapshot of the VM as needed in order to restore the VM to the state of the unmanaged snapshot. Thus, in at least one embodiment, the conversion from an unmanaged to managed snapshot may be performed as part of the request to restore a VM from an existing unmanaged snapshot of the VM.

To further illustrate, consider a first embodiment using the techniques herein that will now be described with reference to FIGS. 3A-3C.

Figure 3A:
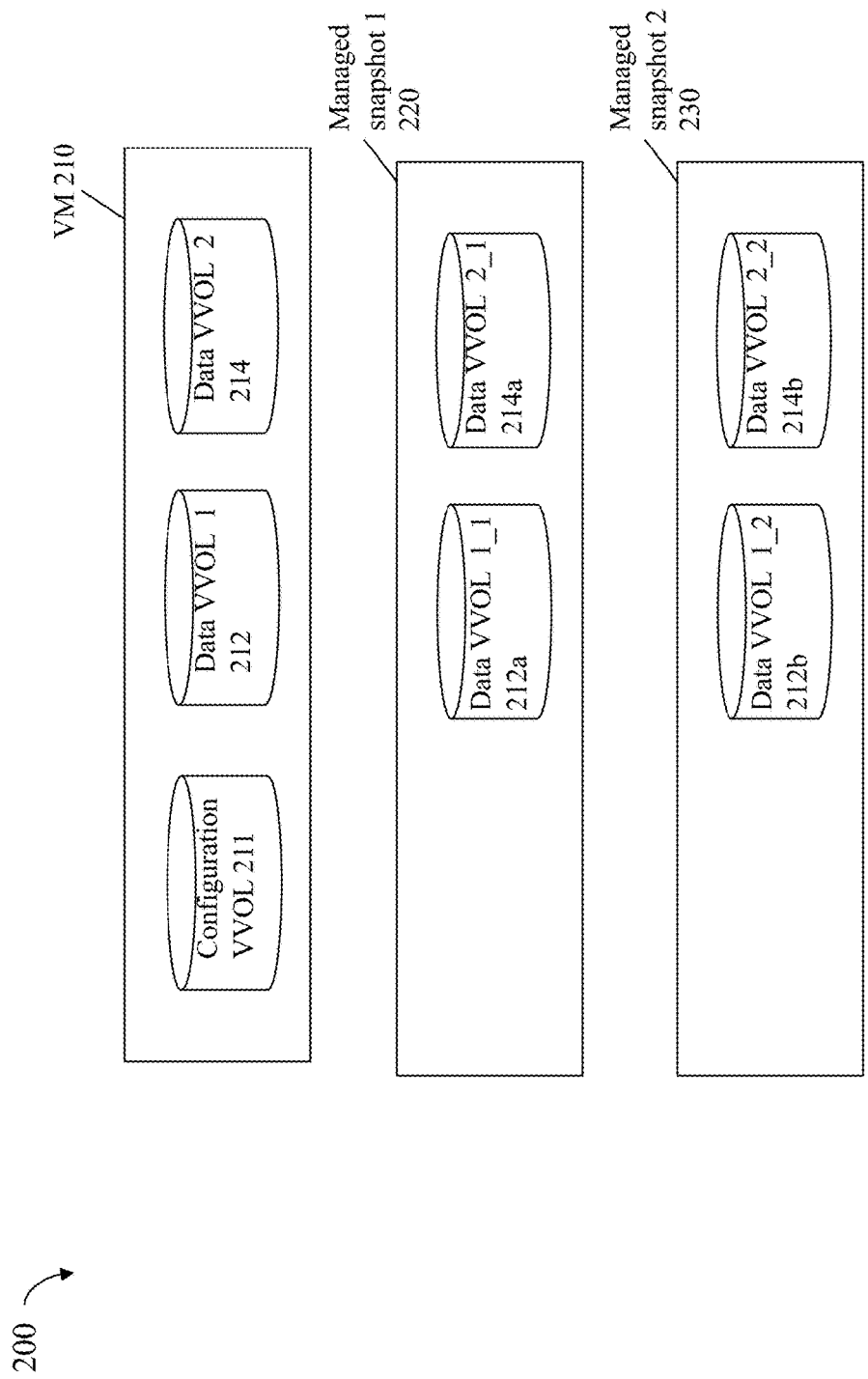
FIGS. 3A, 3B and 3C illustrate use of the techniques herein in a first embodiment.
Figure 3B:
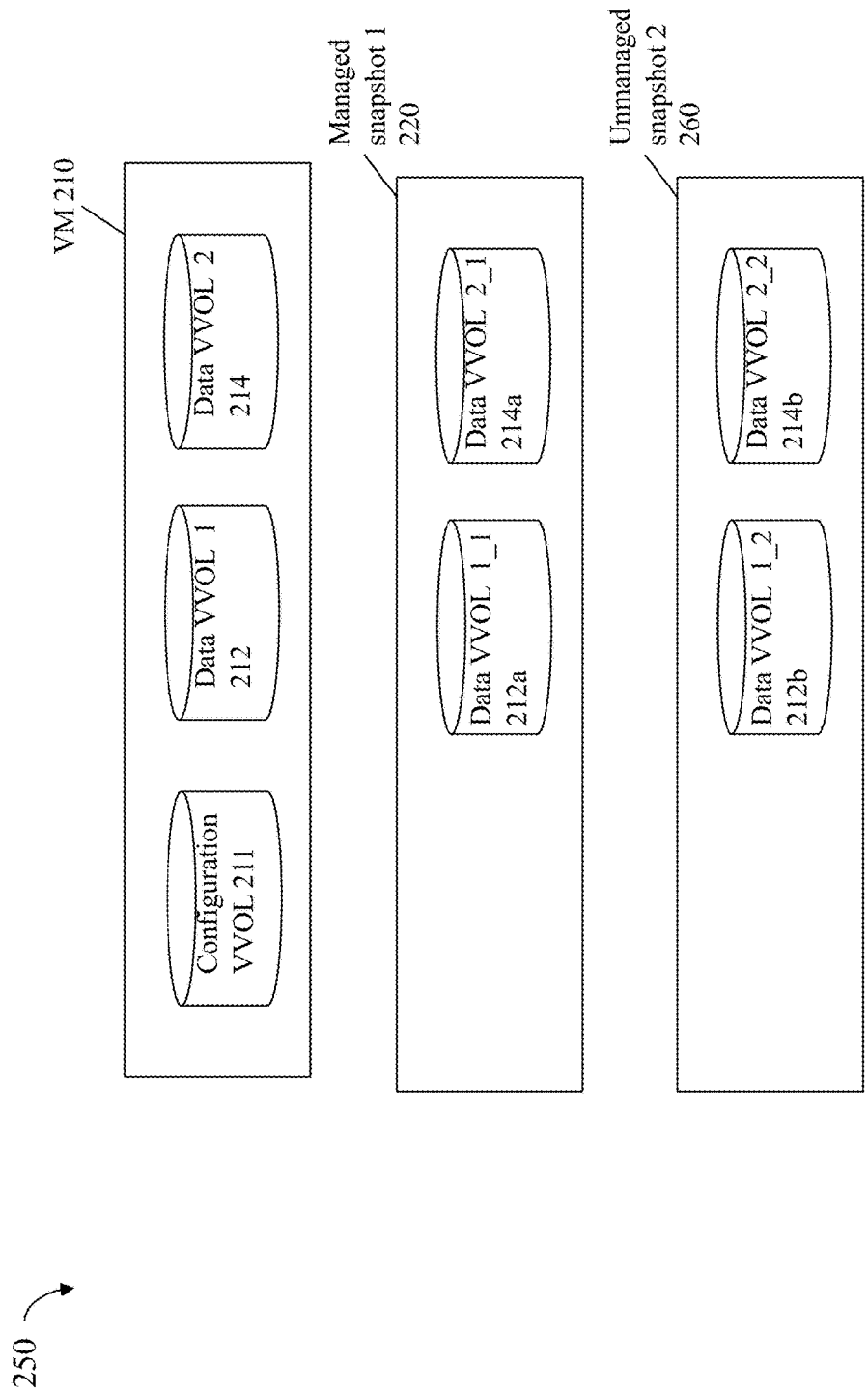

In connection with the first embodiment, FIGS. 3A-B illustrate processing that may be performed in connection with creating or taking a snapshot of a VM.

As a first step in the first embodiment with reference to FIG. 3A, a user creates VM 210 with 2 data VVOLs, VVOL1 212 and VVOL2 214. Additionally, configuration VVOL 211 is created for use with the VM 210 since, as discussed elsewhere herein, each VM includes at least its associated configuration VVOL and at least one data VVOL.

Subsequent to the first step of the first embodiment, a second step may be performed. As the second step in the first embodiment with reference to FIG. 3A, the data storage system requests the virtualization environment to capture a managed snapshot, such as using the VI SDK API. The request to capture the managed snapshot of the VM 210 may be issued, for example, from the data storage system 110 of FIG. 2 to the management server 130 of FIG. 2 using a GUI of a data storage system management application. In at least one embodiment, the storage administrator has the option to request either a crash consistent or a quiesced managed snapshot of the VM 210. Consistent with other discussion herein, the quiesced snapshot of the VM may result in file system consistent or application consistent snapshots depending on VM configuration.

Subsequent to the second step of the first embodiment, a third step may be performed. As the third step in the first embodiment with reference to FIG. 3A, the virtualization environment controls, drives, and performs processing to capture managed snapshot 1 220 of the VM 210, which results in the data storage system creating VVOL level snapshots 212a, 214a, respectively, of the data VVOLs 212, 214. Generally, as noted in the figures and also sometimes referenced in following paragraphs, a snapshot of a VVOL may be denoted as "VVOL X_Y" where X denotes the VVOL number or identifier, and Y denotes the snapshot number or identifier. For example, as illustrated in FIG. 3A, element 212a denotes the first snapshot of VVOL1 which may also be referred to as VVOL 1_1.

The VVOL snapshots 212a, 214a may be created by the virtualization environment leveraging the VASA VVol API snapshotVirtualVolume( ). For example with reference back to FIG. 2, the request to capture a managed snapshot of VM 210 may be issued from the data storage system 110 to the management server 130. In response, the management server 130 may issue the request to the appropriate hypervisor managing the VM 210. For example, assume that VM 210 is the VM 1 120b of FIG. 2. In this case, the management server 130 determines that the hypervisor A 120a is responsible for managing the VM 120b (VM 210) and issues the request over 142 to the hypervisor A 120a on the host A 120 to capture the requested managed snapshot of the VM 120b. In response, the hypervisor A 120a may perform processing to capture the managed snapshot 1 220. Such processing may include the hypervisor 120a issuing requests to the data storage over 140 using the VASA VVol API snapshotVirtualVolume( ) to take individual snapshots of each of the data VVOLs 212, 214.

At this point after the third step of the first embodiment, the first managed snapshot 1 220 of the VM 210 has been created. It should be noted that the virtualization environment may perform other processing than as explicitly described herein to create the first managed snapshot 1 220. For example, the hypervisor 120a of the virtualization environment may create and/or update one or more files in connection with storing VM configuration information describing the configuration of the VM at the time of capturing the managed snapshot 1 220. In at least one embodiment, the VM configuration information may include one or more files stored on the configuration VVOL 211. The VM configuration information may include, for example information regarding the hardware configuration or resources allocated for use by the VM. For example, the VM configuration information captured for a managed snapshot of a VM, such as managed snapshot 1 220 of VM 210 (e.g., where VM 210 may be VM 120b of FIG. 2), may describe the number of CPUs of the host allocated for use by the VM 210 (e.g., number of CPUs of the host 120a allocated for use by VM 120b), the amount of memory (e.g., RAM) allocated for use by the VM 210 (e.g., amount of memory of the host 120a allocated for use by the VM 120b), the particular VVOLs and types of VVOLs used by the VM (e.g., the 2 data VVOLs 212, 214 used by the VM 210), the network communications or ports used by the VM, and the like. Thus, depending on when different managed snapshots of a VM are captured, the associated VM configuration information describing the current configuration of the VM of each managed snapshot may vary if the hardware configuration or resources allocated for use by the VM changes. For example, the number of CPUs allocated for use by the VM, the amount of memory allocated for use by the VM, or the number of virtual disks and thus the number of data VVOLs used by the VM may change over time, whereby the captured VM configuration information for the managed snapshot of the VM reflects the current amount of such resources at the point in time at which the managed snapshot is captured.

Subsequent to the third step of the first embodiment, a fourth step may be performed. As the fourth step in the first embodiment with reference to FIG. 3A, the data storage system may request the virtualization environment to capture another second managed snapshot of the VM 210. Processing of the fourth step may be similar to the second step of the first embodiment as described above. The request to capture the second managed snapshot of the VM 210 may be initiated by the storage administrator such as via a data storage system management application GUI (e.g., as in the second step of the first embodiment described above), or in accordance with a snapshot schedule of the data storage system configured by the storage administrator in advance.

Subsequent to the fourth step of the first embodiment, a fifth step may be performed. As the fifth step in the first embodiment with reference to FIG. 3A, the virtualization environment controls, drives, and performs processing to capture managed snapshot 2 230 of the VM 210, which results in the data storage system creating VVOL level snapshots 212b, 214b, respectively, of the data VVOLs 212, 214. The VVOL snapshots 212b, 214b may be created by the virtualization environment leveraging the VASA VVol API snapshotVirtualVolume( ). For example with reference back to FIG. 2, the request to capture a managed snapshot of VM 210 may be issued from the data storage system 110 to the management server 130. In response, the management server 130 may issue the request to the appropriate hypervisor managing the VM 210. For example, assume that VM 210 is the VM 1 120b of FIG. 2. In this case, the management server 130 determines that the hypervisor A 120a is responsible for managing the VM 120b (VM 210) and issues the request over 142 to the hypervisor A 120a on the host A 120 to capture the requested managed snapshot of the VM 120b. In response, the hypervisor A 120a may perform processing to capture the managed snapshot 2 230. Such processing may include the hypervisor 120a issuing requests to the data storage over 140 using the VASA VVol API snapshotVirtualVolume( ) to take individual snapshots 212b, 214b of each of the data VVOLs 212, 214.

Subsequent to the fifth step of the first embodiment, a sixth step may be performed. As the sixth step in the first embodiment with reference to FIG. 3A, responsive to the creation of the second managed snapshot 230 of the VM 210, the data storage system marks the VVOL level snapshots 212b and 214b for retention as part of an unmanaged snapshot of a VM and issues a request to the virtualization environment to delete managed snapshot 2 230. The request to delete the managed snapshot 2, 230 may be issued by the data storage system 110 of FIG. 2 over 143 to the management server 130 which may then communicate with the appropriate hypervisor managing the VM associated with the managed snapshot being deleted. For example with reference to FIG. 2, assume that managed snapshot 2 230 is a managed snapshot of the VM1 120b managed by hypervisor A 120a. The management server 130 may issue a request to the hypervisor A 120a to perform processing to delete the managed snapshot 2 230 of the VM 210.

Subsequent to the sixth step of the first embodiment, a seventh step may be performed. As the seventh step in the first embodiment with reference to FIG. 3A, as part of the deletion of managed snapshot 2 230 of the VM 210, the virtualization environment invokes the VASA VVol API deleteVirtualVolume( ) to delete second snapshots of the virtual disks 1 and 2 of the VM 210 which correspond respectively to VVOL level snapshots 212b and 214b. For example, the hypervisor 120a may issue a request to the data storage system 110 by invoking the VASA VVol API deleteVirtualVolume( ) to delete the snapshots 212b 214b, respectively, of VVOL1 and VVOL 2. In response, rather than deleting the VVOL level snapshots 212b 214b, the data storage system rather retains the VVOL level snapshots 212b 214b and marks the VVOL level snapshots 212b, 214b as hidden from the virtualization environment. For example, the snapshots 212b, 214b of the VVOL1 and VVOL 2 are no longer visible or exposed to the virtualization environment and no longer reported by the data storage system 110 to the virtualization environment. For example, hypervisor 120a may issue a request to the data storage system 110 using a defined interface, such as one of the VASA VVol APIs like query Virtual Volume( ) or queryVirtualVolumeInfo( ) to return information about defined or known VVOLs and snapshots of such VVOLs that are known or visible to the virtualization environment. With the VVOL level snapshots 212b and 214b marked as hidden from the virtualization environment, the data storage system would not report any information about the VVOL level snapshots 212b, 214b to the virtualization environment since the VVOL level snapshots 212b, 214b are not visible, exposed or known in the virtualization environment. As a result after the seventh step of the first embodiment has completed, managed snapshot 2 230 of FIG. 3A has been converted to unmanaged snapshot 2 260 as in FIG. 3B.

At this point after completion of the seventh step of the first embodiment, the data storage system is aware of the managed snapshot 1 220 and the unmanaged snapshot 2 260 as illustrated in FIG. 3B. However, the virtualization environment is only aware of the managed snapshot 1 220. The data storage system may repeatedly capture unmanaged snapshots of the VM 210 by converting each subsequent managed snapshot of the VM 210 to an unmanaged snapshot of the VM 210 until there is a change in the VM configuration information. Specifically, the fourth, fifth, sixth and seventh steps of the first embodiment described above may be repeated to capture a subsequent managed snapshot of the VM and convert the subsequent managed snapshot of the VM into an unmanaged snapshot of the VM until there is a change in the VM configuration information. Once there has been a change to the VM configuration information associated with the managed snapshot 1 220, a new managed snapshot of the VM 210 needs to be captured and retained in order to retain the correct version of the VM configuration information associated with the new managed snapshot of the VM. In at least one embodiment, the number of unmanaged snapshots of a VM retained per one managed snapshot of the VM is limited only by the data storage system capabilities.

In one aspect, a managed snapshot of a VM may be associated with one or more unmanaged snapshots of the VM to form a chain, family or generation of snapshots of the VM where all snapshots (both managed and unmanaged snapshots of the VM) in the same chain, family or generation use the same version or set of VM configuration information. Once there is a change to the VM configuration information for the VM, a new managed snapshot of the VM is retained to start a new chain, family, or generation of snapshots of the VM where all snapshots (both managed and unmanaged snapshots of the VM) in the new chain, family or generation use the same changed version of the VM configuration information. Consistent with discussion herein, a change to the VM configuration information may render the VM configuration information of one chain, family or generation inconsistent or incompatible for use with a different chain, family or generation. For example, adding a data VVOL of a VM, deleting a data VVOL of a VM, increasing the number of CPUs or amount of memory allocated for use by a VM, and decreasing the number of CPUs or amount of memory allocated for use by a VM all are examples of VM configuration changes that result in an update or change to the VM configuration information for which a new managed snapshot of the VM should be captured and retained for use with the techniques herein of the first embodiment.

What will now be described is processing that may be performed in this first embodiment to restore a snapshot of the VM. For example, processing will be described below in connection with restoration of a selected snapshot of the VM. In at least one embodiment, a selection may be made from both managed and unmanaged snapshots of the VM 210 using snapshot information tracked by the data storage system.

Subsequent to the seventh step above of the first embodiment, processing may be performed to restore VM 210 from one of the managed and unmanaged snapshots of the VM. In connection with performing the desired VM snapshot restoration in the first embodiment, eighth, ninth and tenth steps are discussed in following paragraphs.

In the eighth step of the first embodiment, a request, such as from a user via a GUI of a data storage management application, may request to restore VM 210 from the unmanaged snapshot 2 260 of the VM 210. Since the virtualization environment is not aware of any unmanaged snapshots of the VM 210, this operation may be requested from a data storage system management interface.

Figure 3C:
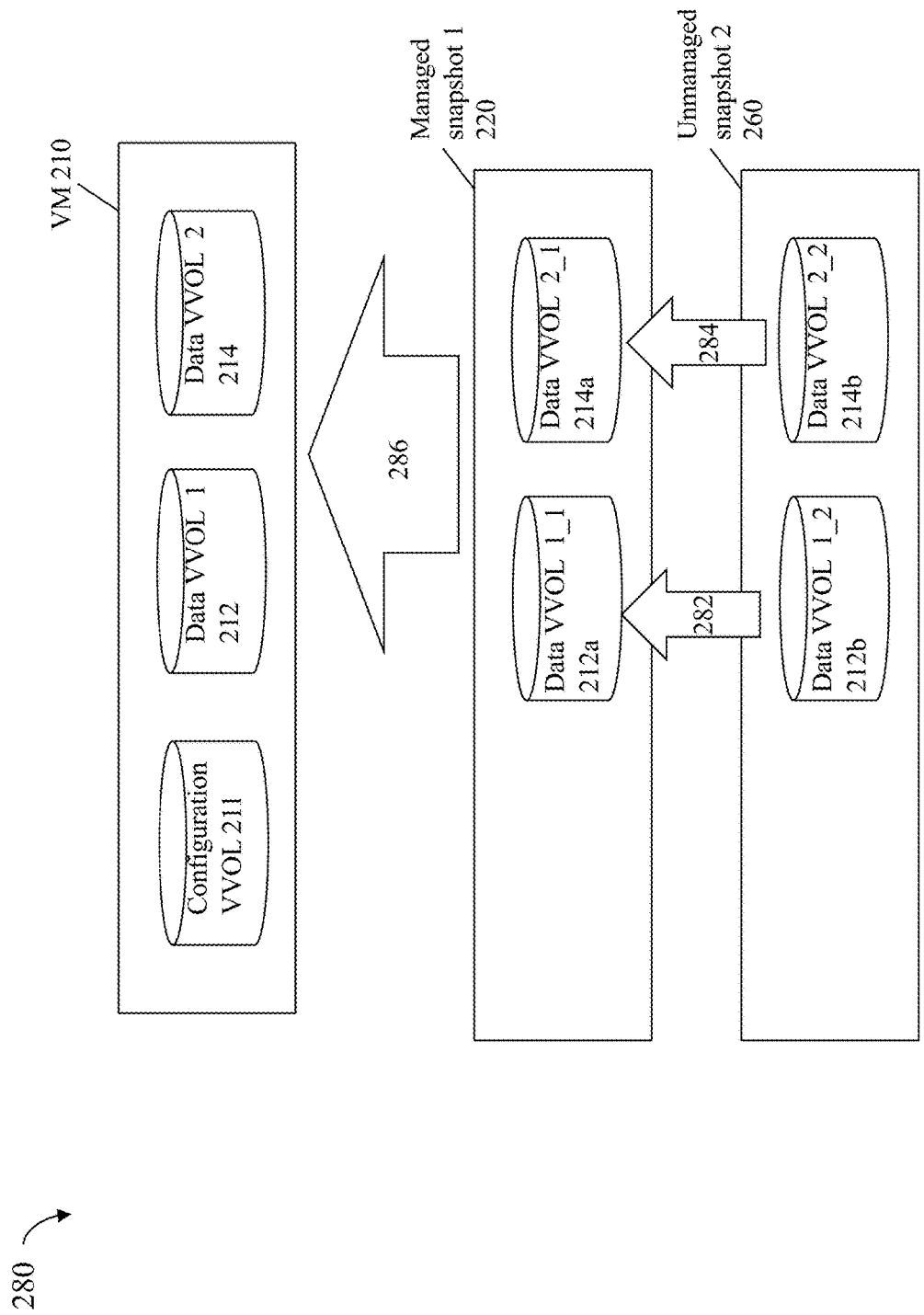

Subsequent to the eighth step of the first embodiment, the ninth step may be performed with reference to FIG. 3C where the data storage system copies the contents of the snapshot VVOLs 212b, 214b, respectively, to the snapshot VVOLs 212a, 214a of the managed snapshot 1 220. Element 282 denotes copying the contents of snapshot VVOL 212b to VVOL 212a. Element 284 denotes copying the contents of snapshot VVOL 214b to VVOL 214a. Once the ninth step has completed, the managed snapshot 1 220 is identical to the unmanaged snapshot 2 260.

Subsequent to the ninth step of the first embodiment, the tenth step may be performed with reference to FIG. 3C where the data storage system requests the virtualization environment to restore (286) the VM 210 from the managed snapshot 1 220 using the VI SDK API. Such a request may be issued from the data storage system 110 of FIG. 2 to the management server 130 which may then communicate with the appropriate hypervisor to complete the restoration request. Once the restoration request of the tenth step has completed, the VM 210 is restored to the state of unmanaged snapshot 2 260, which corresponds to the state of managed snapshot 2 230, since the only difference between managed snapshot 1 220 and unmanaged snapshot 2 260 (and thus also managed snapshot 230) is the contents of the VVOL snapshots 212b, 214b preserved in the unmanaged snapshot 260.

As described above, processing may be performed to convert managed snapshots of a VM to corresponding unmanaged snapshots of the VM. The unmanaged snapshots of the VM are known or visible to the data storage system but not exposed or visible to the virtualization environment. The data storage system tracks the unmanaged snapshots of the VM and tracks which VVOL snapshots are associated with which unmanaged snapshot of the VM. Furthermore, the data storage system tracks which unmanaged snapshots of the VM are associated with a particular managed snapshot of the VM to form a single chain, family or generation of snapshots that use the same VM configuration information. The precise process for restoring a VM may be performed and known to the virtualization environment whereby restoring the VM may be requested by the data storage system.

In the first embodiment, processing is performed to create an initial managed snapshot of a family, chain or generation of snapshots for a VM; and then convert managed snapshots to unmanaged snapshots associated with the prior initial managed snapshot. When a request is issued to restore one of the snapshots of a VM (where such snapshots include both managed and unmanaged snapshots of the VM) and the selected snapshot to be restored is an unmanaged snapshot of the VM, the selected unmanaged snapshot may be converted to a managed snapshot as part of the restoration processing performed.

In connection with the first embodiment, any suitable technique may be used to determine when the VM configuration information has changed thereby signaling to the data storage system that a new managed snapshot of the VM needs to be retained to start a new chain, family or generation of snapshots of the VM. For example, the data storage system may poll the virtualization environment using a defined API to obtain information regarding any changes to VM configurations of VMs. As another example, the virtualization environment may notify the data storage system when there is a change to the VM configuration information of a VM. In this latter example, the data storage system may subscribe or register to receive notification from the virtualization environment regarding changes to VM configurations of VMs.

More generally, the data storage system may use a defined API to obtain any information needed to perform processing as described herein regarding VM configurations. The virtualization environment may also provide information to the data storage system in connection with calls made from the virtualization environment to the data storage system. For example, when creating snapshots of individual data VVOLs associated with a particular managed snapshot, the virtualization environment may provide metadata identifying the particular unique VM (e.g., unique VM identifier) associated with the snapshots of the data VVOLs.

In connection with the first embodiment described above, the ability to restore the VM from an unmanaged snapshot of the VM depends on retaining a single managed snapshot of the VM of the virtualization environment. Additionally, the retained managed snapshot of the VM must use the same version of the VM configuration information as the unmanaged snapshot of the VM. The VM configuration information of the managed snapshot of the VM as retained by the virtualization environment is implicitly used when restoring the VM from the managed snapshot of the VM. If the managed snapshot (that is associated with unmanaged snapshots of the same family or generation) of the VM is deleted, such as by a user, the unmanaged snapshots of the VM of the same family or generation cannot be restored since there is no managed snapshot of the VM having the needed version of the VM configuration information used with the unmanaged snapshots of that family or generation.

Described below is a second embodiment using the techniques herein which does not rely upon the virtualization environment implicitly using a version of the VM configuration information as may be tracked and retained by the virtualization environment. In connection with the techniques of the second embodiment described below, the particular version of the VM configuration information of a managed snapshot of the VM may obtained and stored on the data storage system as part of the processing performed when converting a managed snapshot of the VM to an unmanaged snapshot of the VM. In this manner, the data storage system may manage, control and retain the VM configuration information used with the unmanaged snapshot of the VM. Additionally, in connection with restoring the VM from an unmanaged snapshot of the VM, the data storage system may provide the VM configuration information, such as in the form of a file or other storage object, to the virtualization environment rather than rely on the virtualization environment implicitly using the VM configuration information associated with an existing managed snapshot of the VM.

Figure 4A:
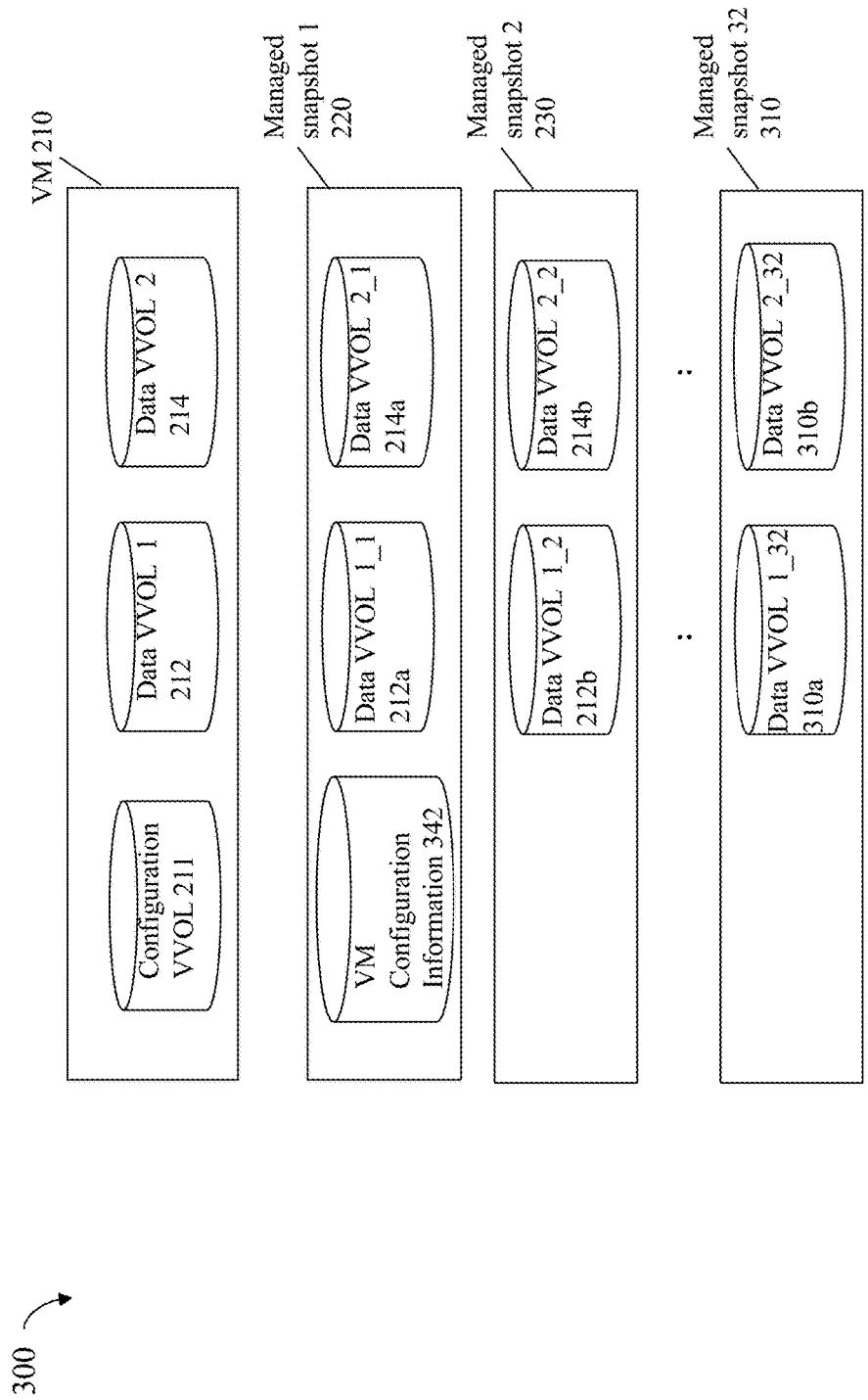
FIGS. 4A, 4B, 4C, 4D and 4E illustrate use of the techniques herein in a second embodiment.

With reference to FIG. 4A, the first, second and third steps of the second embodiment are as described above in connection with the first embodiment. Thus, after the third step of the second embodiment, managed snapshot 1 220 of the VM 210 has been created. However, the VM configuration information 342 of FIG. 4A has not yet been obtained by the data storage system. The VM configuration information 342 of FIG. 4A is obtained in a subsequent step discussed below.

Subsequent to the third step of the second embodiment, a fourth step of the second embodiment is performed that captures managed snapshots 2-32 of the VM 210. Capturing the managed snapshot 2 230 through managed snapshot 32 310 of the VM 210 may be performed by repeating processing as described above in connection with the first, second and third steps of the first embodiment to create each managed snapshot of the VM 210.

Subsequent to the fourth step of the second embodiment, a fifth step of the second embodiment is performed where a request is made to capture a 33rd managed snapshot of the VM 210. The request may be received at the data storage system 110 such as using a GUI of a data storage management application or based on a defined snapshot schedule. In this second embodiment, the virtualization environment may have a maximum limit of 32 snapshots (thus 32 managed snapshots) of a single VM. Thus, to capture the next 33rd managed snapshot of the VM 210, processing may be performed to first convert one of the existing 32 managed snapshots of the VM 210 to an unmanaged snapshot of the VM. In at least one embodiment, the oldest managed snapshot of the VM, such as managed snapshot 220, may be converted to an unmanaged snapshot. However, more generally, any suitable technique may be used to select one of the existing 32 managed snapshots of the VM to be converted to an unmanaged snapshot of the VM.

Subsequent to the fifth step of the second embodiment, a sixth step is performed where the data storage system obtains the VM configuration information associated with managed snapshot 1 220 of the VM 210. In at least one embodiment, the particular version of the VM configuration information associated with managed snapshot 1 220 may be obtained from the virtualization environment. For example, the data storage system 110 may issue a request to the management server 130 using API to obtain a file or other storage object including particular version of the VM configuration information used by the managed snapshot 1 220 of the VM 210. The data storage system may receive the requested VM configuration information 342 from the virtualization environment and may store it on the data storage system (e.g., store on a PD of the data storage system). Additionally, the data storage system associates the VM configuration information 342 with the managed snapshot 1 220.

FIG. 4A shows the state of the VM and its 32 managed snapshots after completing the fifth step of the second embodiment. It is noted that the VM configuration information 342 is visible and known to the data storage system and associated with the managed snapshot 1 220 of the VM 210. Consistent with other discussion herein, each of the 32 managed snapshots illustrated has associated VM configuration information that is also managed and known to the virtualization environment. However, the particular files or other storage objects that contain the VM configuration for managed snapshots, where such files or other storage objects are known to, and managed by, the virtualization environment and not the data storage system, are not illustrated in the FIG. 4A.

Subsequent to the sixth step of the second embodiment, a seventh step is performed that marks the snapshots VVOLs 212a, 214a for retention as an unmanaged snapshot of the VM 210. As part of the seventh step, the data storage system requests that the virtualization environment delete managed snapshot 1 220. For example, the data storage system may issue the request to delete managed snapshot 1 220 over connection 143 to the management server 130.

Figure 4B:
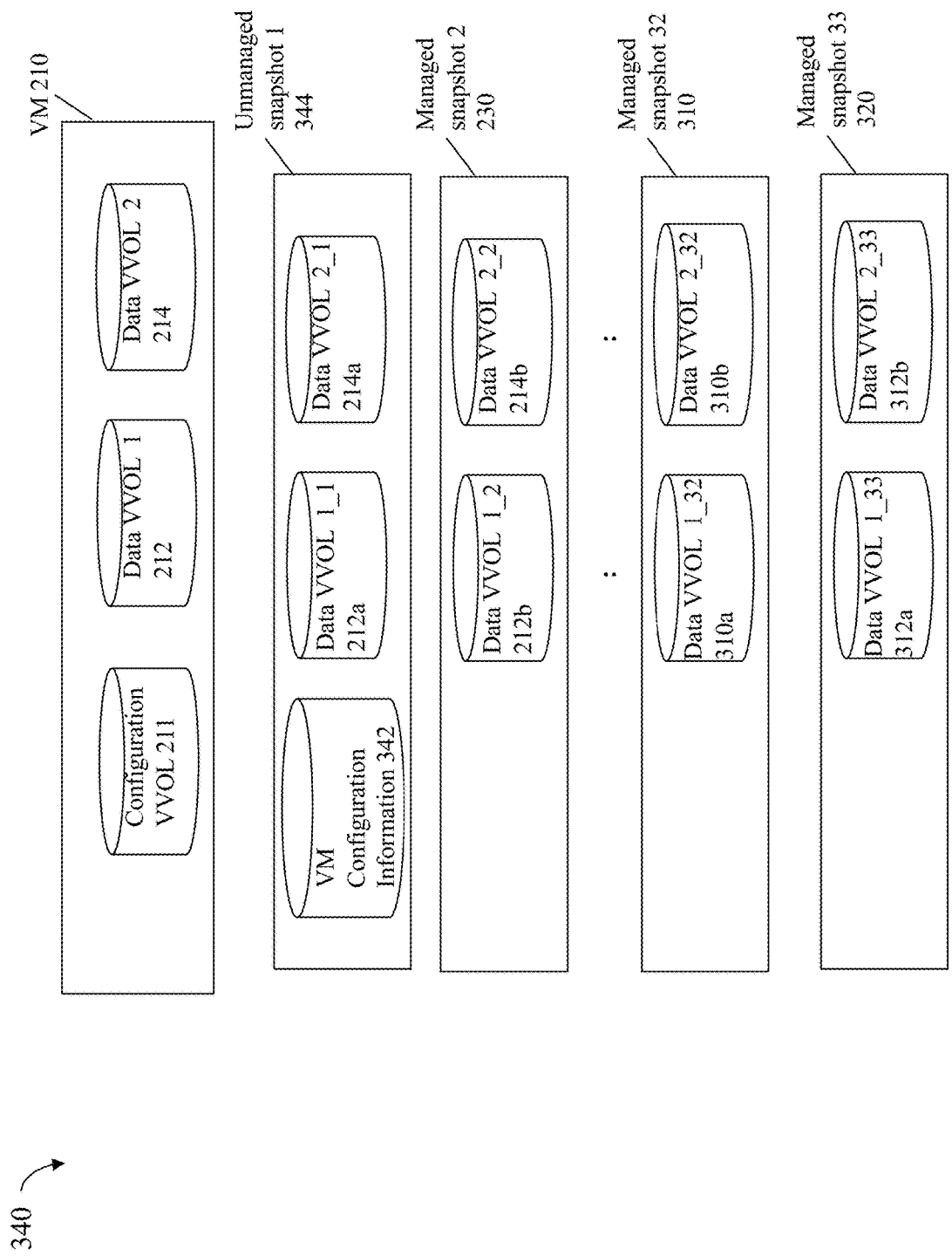

Subsequent to the seventh step of the second embodiment, an eighth step is performed as part of the deletion of managed snapshot 1 220. In the eighth step of the second embodiment, the virtualization layer invokes the VASA VVol API deleteVirtualVolume( ) to delete the VVOL snapshots 212a, 214a. However, instead of deleting those VVOL snapshots 212a, 214a, the data storage system retains them, and marks them as hidden from the virtualization environment. Subsequent to completing the seventh step of the second embodiment and with reference to FIG. 4B, unmanaged snapshot 1 344 of the VM 210 is created. This eighth step of the second embodiment is similar to the seventh step of the first embodiment described above.

Subsequent to the eighth step of the second embodiment, a ninth step is performed to capture the requested 33rd snapshot of the VM where the 33rd snapshot is a managed snapshot. As part of the ninth step, a request may be issued from the data storage system to the virtualization environment to capture the 33rd managed snapshot of the VM 210. For example, the request may be issued from the system 210 to the management server 130 over connection 143 using the VI SDK API. The eight step of the second embodiment may include processing similar to the second step of the first embodiment described above.

Subsequent to the ninth step of the second embodiment, a tenth step is performed where the virtualization environment captures managed snapshot 33 320 of the VM 210 which results in the data storage system creating VVOL snapshots 312a, 312b, respectively, of VVOLs 212, 214 of the VM 210. The VVOL snapshots 312a, 312b may be created by the virtualization environment leveraging VASA VVOL API snapshotVirtualVolume( ). The tenth step of the second embodiment may include processing similar to the third step of the first embodiment described above.

At this point after completing the tenth step of the second embodiment, the data storage system is aware of 33 total snapshots of the VM 210—unmanaged snapshot 1 344, and managed snapshots 2 230 through managed snapshot 33 320. The virtualization environment is aware of 32 managed snapshots of the VM 210—managed snapshots 2 230 through managed snapshot 33 320. However, the virtualization environment is not aware of unmanaged snapshot 1 344.

Generally, the processing described above of converting a managed snapshot of a VM to an unmanaged snapshot of a VM once the virtualization environment maximum number of 32 managed snapshots of the VM has been reached may be repeated a number of times responsive to requests to create the next managed snapshots of the VM. The number of times it may be repeated depends on the data storage system maximum limit for the number of snapshots per VVOL (e.g., until the maximum limit of 256 snapshots for a single VVOL has been reached).

What will now be described is processing that may be performed in this second embodiment to restore a snapshot of the VM. For example, processing will be described below in connection with restoration of a selected snapshot of the VM. In at least one embodiment, a selection may be made using the data storage system from both managed and unmanaged snapshots of the VM 210.

Subsequent to the tenth step above of the second embodiment, processing may be performed to restore VM 210 from one of the managed and unmanaged snapshots of the VM. In connection with performing the desired VM snapshot restoration in the second embodiment, steps discussed in following paragraphs may be performed beginning with the eleventh step.

In the eleventh step of the second embodiment, a request, such as from a user via a GUI of a data storage management application, may request to restore VM 210 from the unmanaged snapshot 1 344. Since the virtualization environment is not aware of any unmanaged snapshots of the VM 210, this operation may be requested from a data storage system management interface.

Generally, if the current number of managed snapshots of the VM 210 is at the maximum number allowed by the virtualization environment, it is necessary to first convert one of the existing managed snapshots of the VM to an unmanaged snapshot of the VM. Such processing to convert an existing managed snapshot of the VM to an unmanaged snapshot of the VM is described above. In connection with the example of FIG. 4B with 32 managed snapshots of the VM 210, it is necessary to first convert one of the 32 managed snapshots to an unmanaged snapshot of the VM. In the example 340 of FIG. 4B, the managed snapshot 2 230 may be the oldest of the 32 managed snapshots of the VM 210 whereby the managed snapshot 2 230 is selected for conversion to an unmanaged snapshot.

Thus, in this particular example, a twelfth step may be performed subsequent to the eleventh step of the second embodiment. In the twelfth step, processing is performed to convert the managed snapshot 2 230 of the VM 210 to an unmanaged snapshot. Processing to convert the managed snapshot 2 230 to an unmanaged snapshot of the VM 210 is similar to that as described above in this second embodiment in connection with converting the managed snapshot 1 220 to unmanaged snapshot 1 344.

Figure 4C:
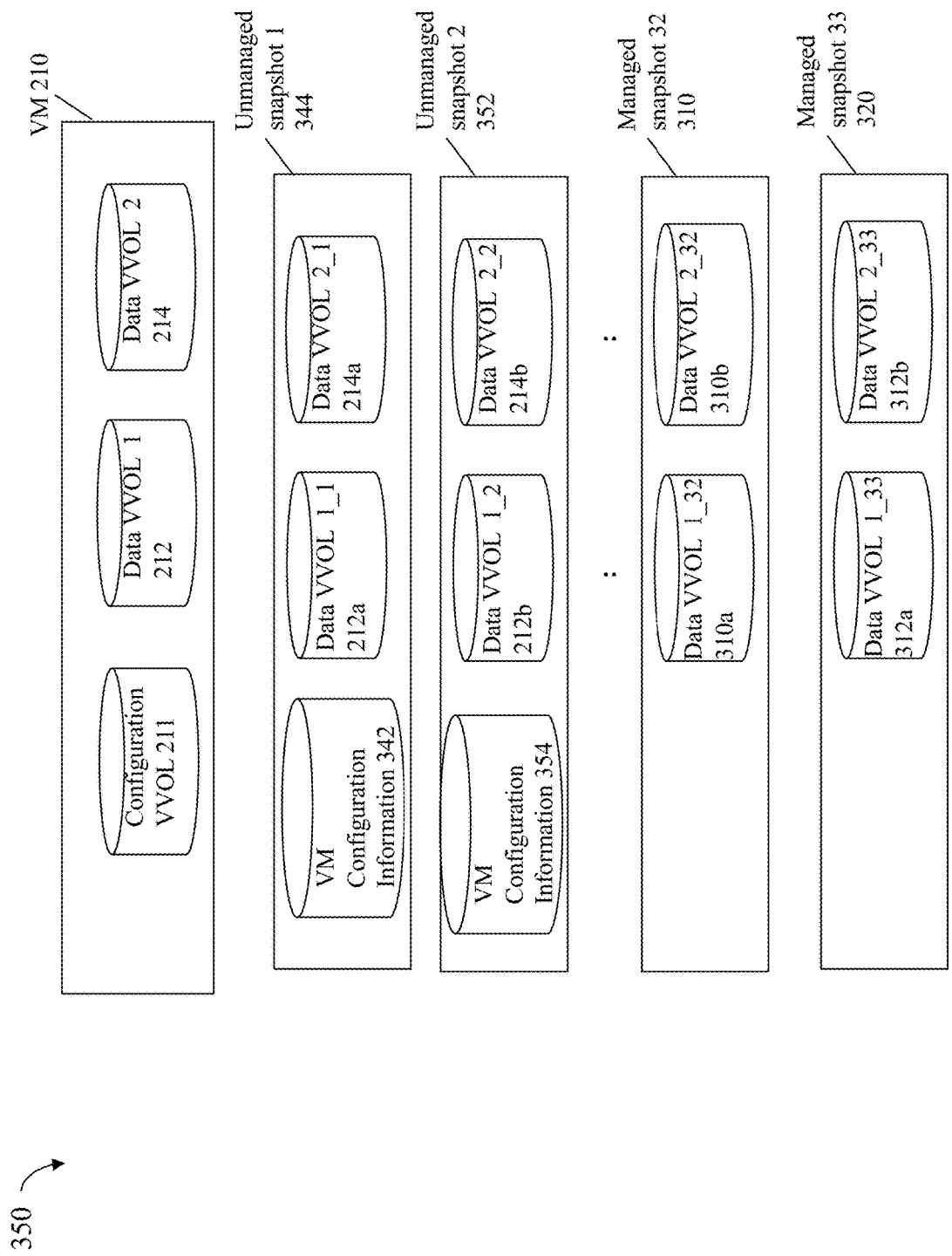

Referring to FIG. 4C, shown is the resulting state of snapshots of the VM 210 after completing the twelfth step of the second embodiment. The example 350 illustrates that the managed snapshot 2 230 of FIG. 4B has been converted to unmanaged snapshot 2 352 where the unmanaged snapshot 2 352 includes the same VVOL snapshots 212*b*, 214*b* and also includes VM configuration information 354. The VM configuration information 354 is the particular version of the VM configuration information that is obtained from the virtualization environment and is used in connection with managed snapshot 2 230. Thus, elements 354, 212*b* and 214*b* are associated with unmanaged snapshot 2 352.

Subsequent to the twelfth step of the second embodiment, a thirteenth step is performed which leverages or uses the virtualization environment to recreate a managed snapshot of the VM from the unmanaged snapshot 1 344 of FIG. 4C. The data storage system requests that the virtualization environment recreate a managed snapshot from the unmanaged snapshot 1 344, where the data storage system specifies both the snapshots 212*a*, 214*a* of the data VVOLs and the VM configuration information 342. The request may be issued from the data storage system 110 to the management server 130 of the virtualization environment.

Figure 4D:
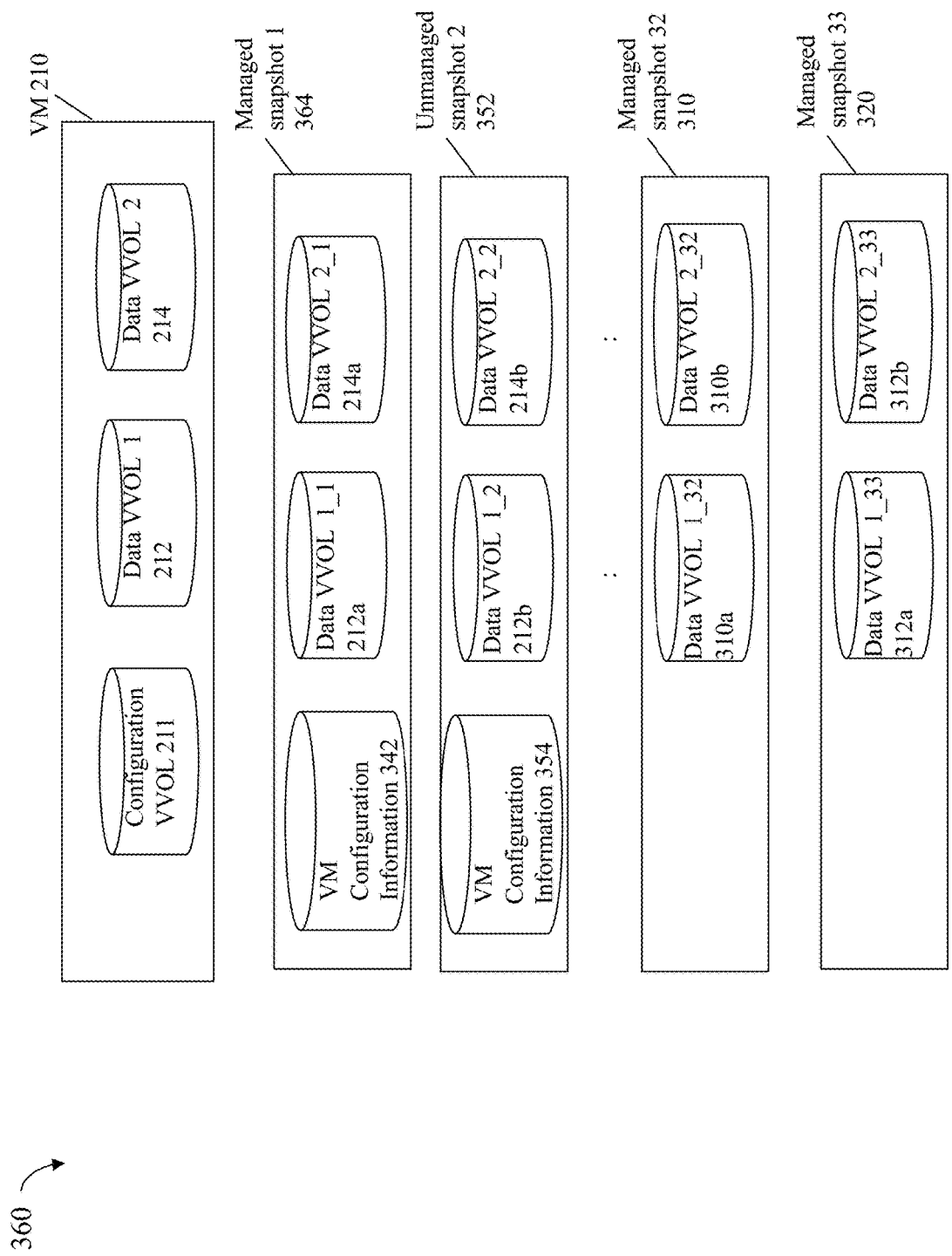

FIG. 4D illustrates the results after creating the managed snapshot 1 364 from the unmanaged snapshot 1 344 of FIG. 4C.

Figure 4E:
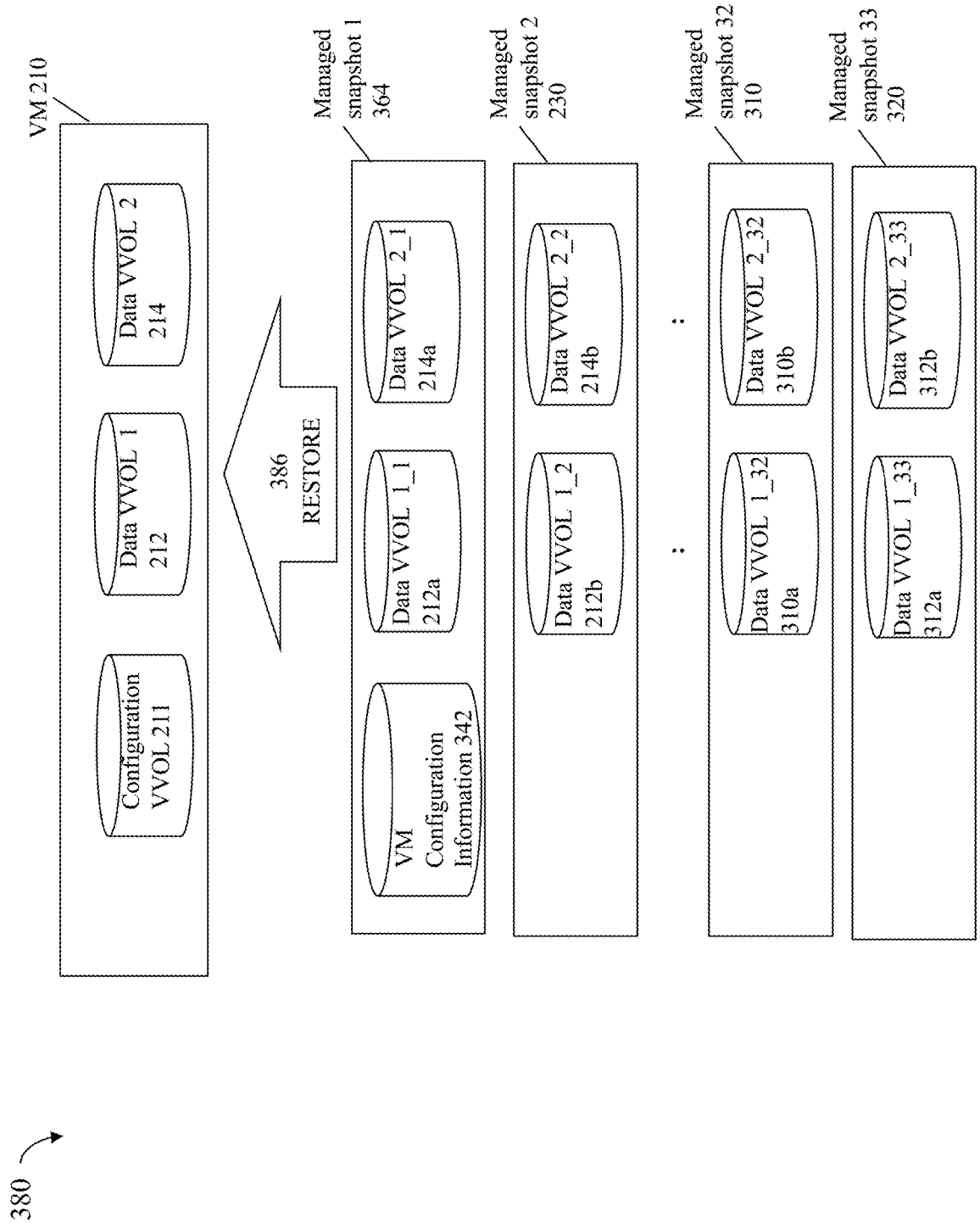

Subsequent to the thirteenth step of the second embodiment, a fourteenth step is performed with reference to FIG. 4E where the data storage system requests that the virtualization environment restore 386 the VM 210 from the managed snapshot 1 364.

What will now be described with reference to FIGS. 5A-5D are more detailed processing steps of the second embodiment described above. The FIGS. 5A-5D are in the form of sequencing diagrams illustrating communications between different components in at least embodiment in accordance with the techniques.

In FIGS. 5A-5D, element 402 denotes the administrator (admin) that may issue a request, such as via the GUI 404 of a data storage system management application of the data storage system 110 of FIG. 2; element 406 denotes the data storage system (DS) snapshot (snap) facility or snap scheduler of the data storage system 110; element 408 denotes the VASA API provider of the data storage system 110; and element 410 denotes the virtualization environment.

Figure 5A:
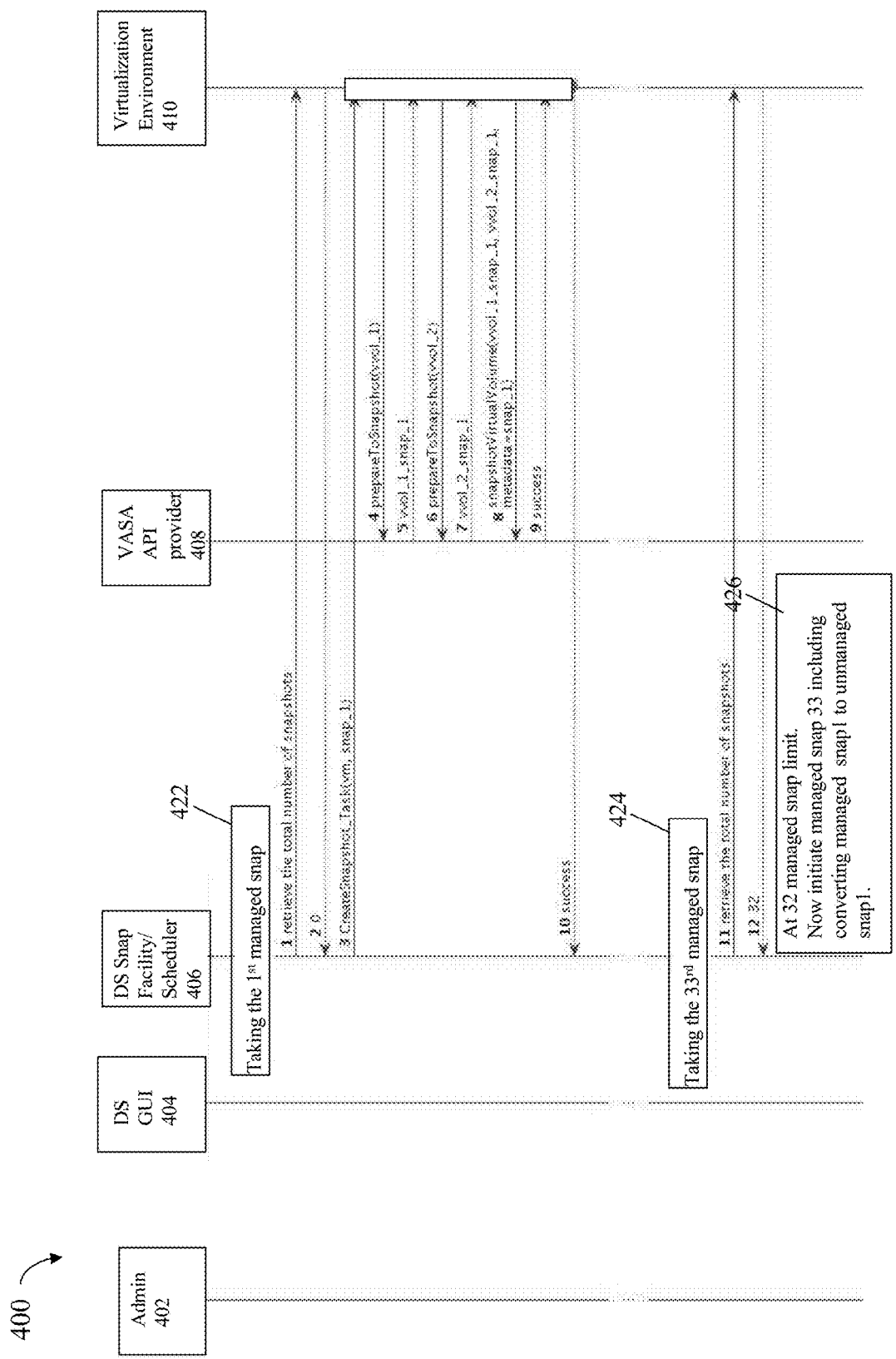
FIGS. 5A, 5B, 5C and 5D are sequence diagrams providing more details of the second embodiment in accordance with the techniques herein.

Referring to FIG. 5A, steps 1-10 denote processing performed to take the first managed snapshot of the VM. In step 1, a request is sent from the DS snap facility 406 to the virtualization environment 410 requesting the total number of snapshots, which are managed snapshots, currently recognized by the virtualization environment. In response in step 2, a zero is returned since none currently exist for the VM 210. In step 3, a request is made from the DS snap facility 406 to the virtualization environment 410 to create managed snapshot 1 for the VM. In response, the virtualization environment 410 communicates with the VASA API provider 408 as denoted by steps 4-9 to create managed snapshot 1 of the VM. In particular, steps 4-5 prepare for taking a snapshot (snap 1) of data VVOL1 and steps 6-7 prepare for taking a snapshot (snap1) data VVOL2. The step 8 is the request to create the snapshots of VVOLs 1 and 2 and associate the VVOL level snapshots of VVOL1 and VVOL2 with managed snapshot 1, as denoted by the metadata in step 8. The step 9 denotes the reply sent to the virtualization environment 410 regarding successful creation of managed snapshot 1 of the VM. Step 10 denotes the reply regarding success return from the virtualization environment 410 to the DS snap facility 406.

As described above, the processing denoted by the steps 3-10 may be repeated (in sequence) 32 times to create 32 managed snapshots, such as 32 snapshots of a VM based on a defined schedule of when to take snapshots of the VM. Element 424 denotes processing commencing to now take a 33rd managed snapshot of the VM. Step 11 is a request from the DS snap facility to retrieve the current number of managed snapshots from the virtualization environment 410 where 32 is returned in step 12. As denoted by 426, the managed snapshot limit is 32 so processing performed to initiate managed snapshot 33 includes converting managed snapshot 1 of the VM to unmanaged snapshot 1 of the VM.

Figure 5B:
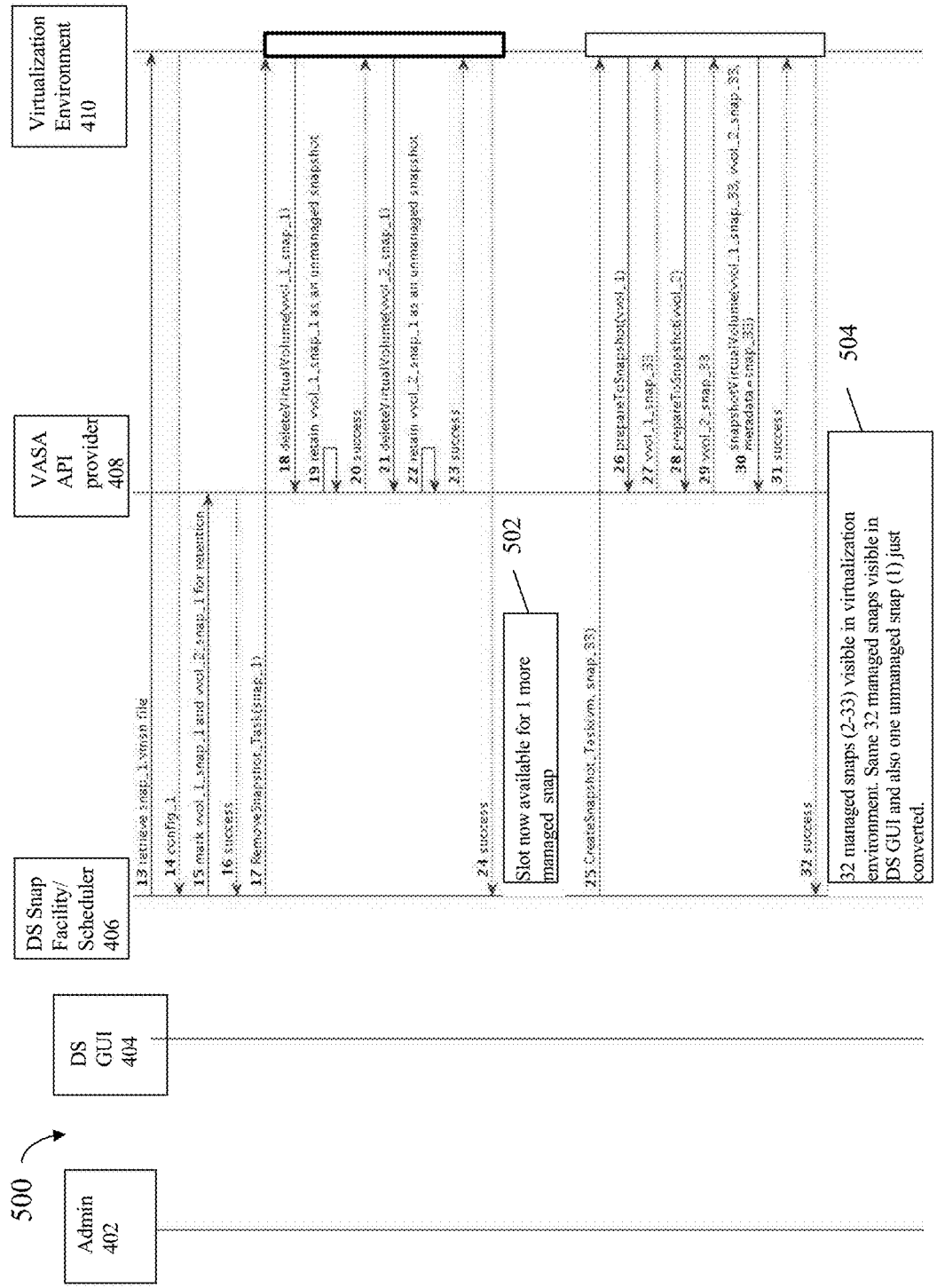
Figure 5C:
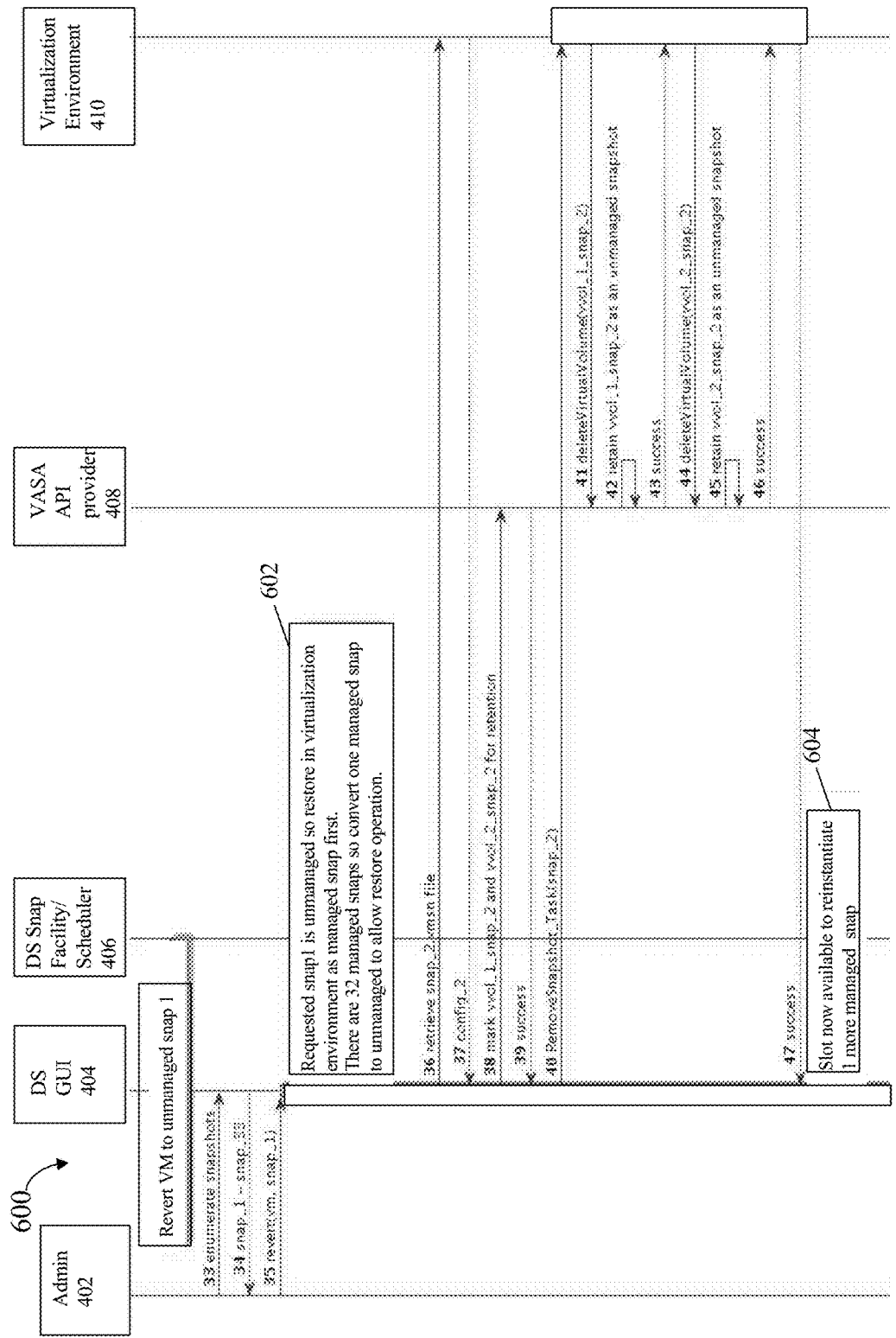
Figure 5D:
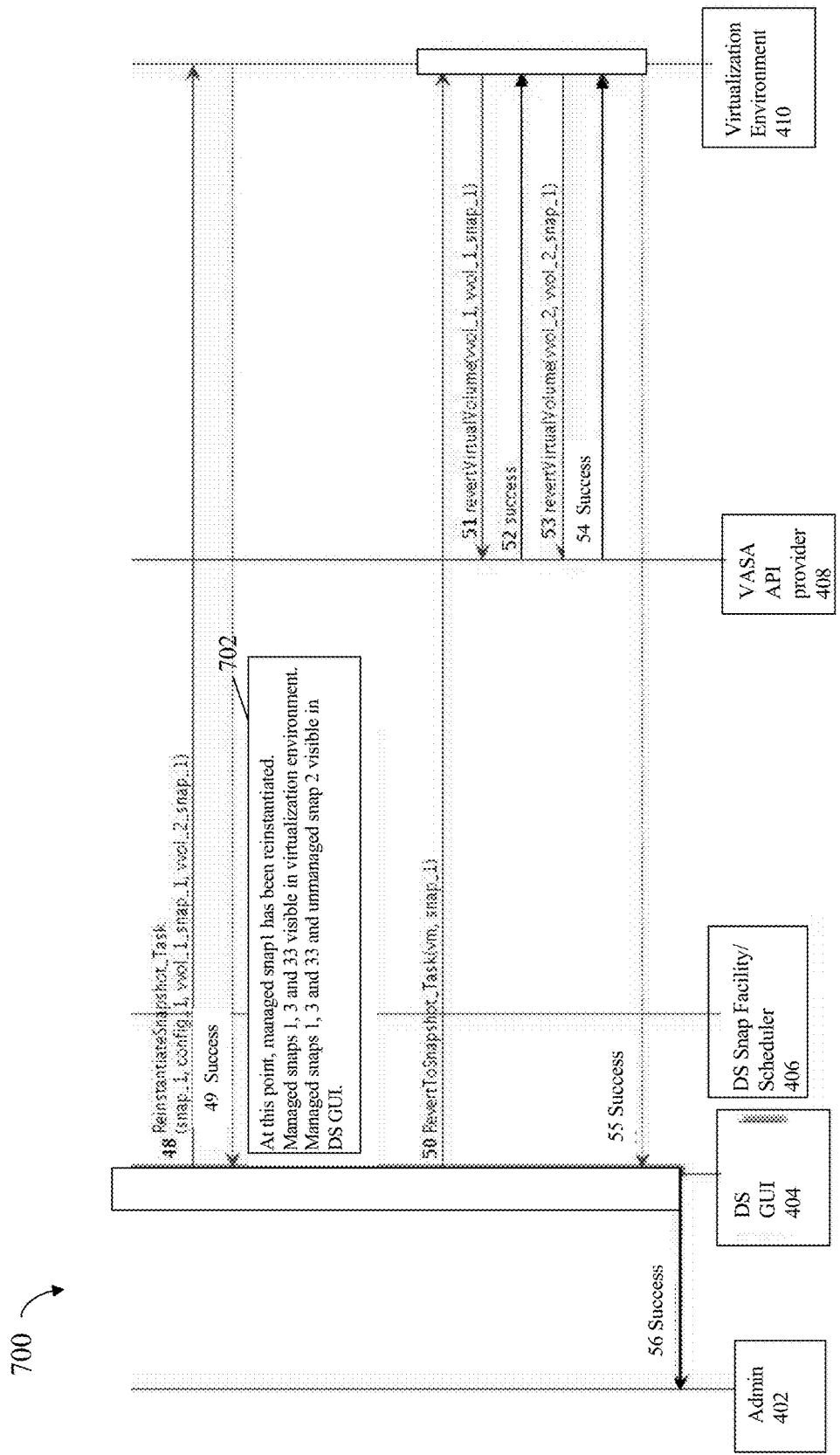

Referring to FIG. 5B, step 13 illustrates sending a request from the DS snap facility to retrieve the VM configuration information for managed snapshot 1 of the VM. In this example, the VM configuration information is returned in the step 14 in a file having the file type or extension VMSN. In the step 15, the DS snap facility 406 sends a request to the VASA API provider 408 to mark the snap1 of VVOL 1 and the snap1 of VVOL (where the snaps are associated with the managed snapshot 1 of the VM) for retention. The step 16 returns a reply of success from the VASA API provider 408 to the DS Snap facility 406. In the step 17, a request is issued from the DS Snap facility 406 to the virtualization environment 410 to remove managed snapshot 1 of the VM. In response, the virtualization environment 410 communicates with the VASA API provider 408 in the steps 18-23.

The virtualization environment 410 issues a request to the VASA API provider 408 to delete the snap1 of data VVOL1 in step 18. In response, the data storage system retains (step 19) snap 1 of VVOL1 as part of an unmanaged snapshot 1 of the VM, and then a reply of success is returned (step 20) from the VASA API provider 408 to the virtualization environment 410.

The virtualization environment 410 issues a request to the VASA API provider 408 to delete the snap1 of data VVOL2 in the step 21. In response, the data storage system retains (step 22) snap 1 of VVOL2 as part of an unmanaged snapshot 1 of the VM, and then a reply of success is returned (step 23) from the VASA API provider 408 to the virtualization environment 410. Additionally, a reply of success is returned (step 240) from the virtualization environment 410 to the DS Snap facility 406.

At this point, as denoted by 502, there is now 1 open or available managed snapshot slot so that in the step 25, a request is issued from the DS snap facility 406 to the virtualization environment 410 to create managed snapshot 33. In response the virtualization environment 410 communicates with the VASA API provider 408 to prepare to take the 33rd VVOL level snapshots of VVOL1 (steps 26, 27) and VVOL 2 (step 28, 29) and then actually take the 33rd snapshots of VVOL1 and VVOL 2 (step 30). As denoted by the step 30, the request indicates that the 33rd snapshots of VVOL1 and VVOL2 are associated with the 33rd managed snapshot of the VM (e.g., metadata=snap_33). In the step 31, a successful reply is returned to the virtualization environment 410. In response to the step 31, the virtualization environment 410 returns (step 32) a response of success to the DS Snap facility 406 (in response to the request issued in the step 25).

As indicated by element 504, after completion of the step 32, there are 32 managed snapshots (denoted as snapshots 2-33) and 1 unmanaged snapshot (denoted as snapshot 1) of the VM. The managed snapshots 2-33 are visible in both the virtualization environment 410 and the DS GUI 404. The unmanaged snapshot 1 just converted is only available or listed in the DS GUI 404 but not the virtualization environment 410.

At this point, a request is made in the step 33 by an admin 402 via the DS GUI 404 to list all the snapshots of the VM. The step 34 indicates that the 33 snapshots of the VM are returned and listed in the GUI. The admin 402 makes a request (step 35) to revert or restore the snapshot 1 of the VM. In this example as denoted by 602, the snapshot 1 of the VM is an unmanaged snapshot so the unmanaged snapshot 1 needs to be restored as a managed snapshot. However, there are currently 32 managed snapshots so, prior to restoring snapshot1 as a managed snapshot, one other managed snapshot needs to be converted to an unmanaged snapshot. In this example, the oldest managed snapshot2 is selected for conversion to an unmanaged snapshot.

In the step 36, the DS GUI 404 requests (step 36) the VM configuration file for the managed snapshot 2 of the VM from the virtualization environment 410. The VM configuration file (config_2) is returned (step 37) from the virtualization environment 410 to the DS GUI 404. The DS GUI 404 requests (step 38) that the VASA API provider 408 marks snap 2 of VVOL1 and snap2 of VVOL2 retention. A successful response is returned (step 39) from VASA API provider 408 to the DS GUI 404.

In the step 40, a request is issued from the DS GUI 404 to the virtualization environment 410 to delete the managed snapshot 2 of the VM. The virtualization environment 410 requests (step 41) deletion of snap2 of VVOL1. In response to the request of the step 41, the data storage system retains (step 42) snap2 of VVOL1 as part of unmanaged snapshot 1. In step 43, a response of success is returned to the virtualization environment 410. The virtualization environment 410 requests (step 44) deletion of snap2 of VVOL2. In response to the request of step 44, the data storage system retains (step 45) snap2 of VVOL2 as part of unmanaged snapshot 1. In the step 46, a response of success is returned to the virtualization environment 410. In the step 47, a response of success (regarding the request of step 35) is returned to the DS GUI 604.

At this point as denoted by 604, there are 31 managed snapshots so there is now an open position for a managed snapshot. At the step 48, a request is made from the DS GUI 604 to the virtualization environment 410 to reinstantiate unmanaged snapshot 1 of the VM as a managed snapshot. In particular, the request in the step 48 includes the snapshots of the data VVOLs (e.g., snap1 of the data VVOL1, snap1 of the data VVOL2) associated with the unmanaged snapshot1. Additionally, the request of the step 48 also provides the file config 1, previously saved VM configuration information for the unmanaged snapshot1. In response to the request of the step 48, the virtualization environment reinstantiates the unmanaged snapshot1 as a managed snapshot and returns success in the step 49 to the DS GUI 404.

At this point after the step 49, the managed snapshot 1 has been reinstantiated. Managed snapshots 1, 3 and 33 of the VM are visible in the virtualization environment and also the DS GUI. Additionally, unmanaged snapshot 2 of the VM is visible in the DS GUI 404 but not in the virtualization environment 410.

In the step 50, a request is issued from the DS GUI 404 to the virtualization environment 410 to revert or restore the VM to snapshot 1 of the VM. In the step 51, the virtualization environment 410 requests the VASA API provider 408 to revert or restore VVOL1 from snap1 of VVOL. Upon completion of the request of the step 51, a successful reply is returned in the step 52 from the virtualization environment 410 to the VASA API provider 408. In the step 53, the virtualization environment 410 requests the VASA API provider 408 to revert or restore VVOL2 from snap1 of VVO2. Upon completion of the request of the step 53, a successful reply is returned in the step 54 from the VASA API provider 408 to the virtualization environment 410. Subsequently, a successful reply is returned in the step 55 from the virtualization environment 410 to the DS GUI 404 (reply in response to the request issued in the step 48). A successful reply is also returned in the step 56 from the DS GUI 404 to the admin 402 (reply in response to the request issued in the step 35).

Figure 6:
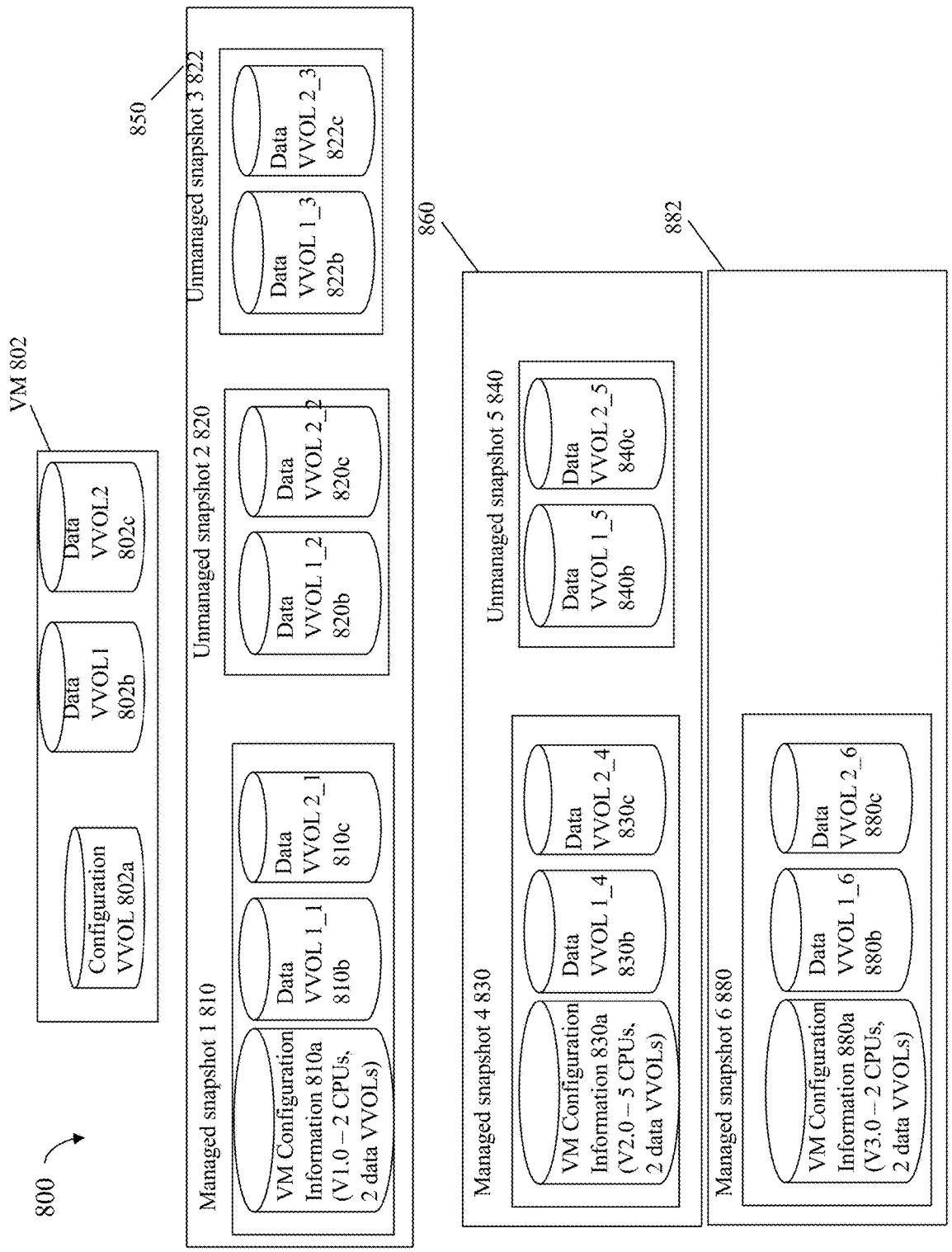
FIGS. 6 and 7 are examples of families or generations of snapshots in an embodiment in accordance with the techniques herein.

Referring to FIG. 6, shown is an example 800 illustrating families or generations of snapshots of a VM in an embodiment in accordance with the techniques herein. The example 800 includes a VM 802 with a configuration VVOL 802s and 2 data VVOLs 802b-c. Using the techniques described herein, managed snapshot 1 810, unmanaged snapshot 2 820 and unmanaged snapshot 3 822 of the VM 802 may be included in 850 denoting a first generation or family of snapshots of the VM 802. Managed snapshot 1 810 may include VM configuration information 810a, snapshot 1 810b of data VVOL1, and snapshot 1 810c of data VVOL2 The VM configuration information 810a may indicate that V1.0 of the VM configuration of VM 802 includes 2 CPUs and 2 data VVOLs. Unmanaged snapshot 2 820 of the VM 802 may include snapshot 2 820b of VVOL1 and snapshot 2 820c of VVOL2. Unmanaged snapshot 3 822 of the VM 802 may include snapshot 3 822b of VVOL1 and snapshot 3 822c of VVOL2. Each of the unmanaged snapshots 820, 822 and the managed snapshot 810 may use the same VM configuration information 810a of the managed snapshot 810. Thus, the same set of VM configuration information 810a is associated with all snapshots 810, 820 and 822 of the same family 850.

In this example, after the snapshots 810, 820 and 822 have been created of the VM 802, a change is made to the VM configuration where the number of CPUs allocated is increased from 2 to 5. Accordingly, the VM configuration information of 810a is updated to the updated version 2 as denoted by 830a. In connection with the techniques herein, a new managed snapshot 4 830 is captured which includes the VM configuration information 830a, snapshot 4 830b of VVOL1, and snapshot 4 830c of VVOL2. The VM configuration information 830a may indicate that V2.0 of the VM configuration of VM 802 includes 5 CPUs and 2 data VVOLs.

In accordance with the techniques described herein, managed snapshot 4 830 and unmanaged snapshot 5 840 may be included in 860 denoting a second generation or family of snapshots of the VM 802. Unmanaged snapshot 5 840 of the VM 802 may include snapshot 5 840b of VVOL1 and snapshot 5 840c of VVOL2. The unmanaged snapshot 840 and the managed snapshot 830 may use the same VM configuration information 830a of the managed snapshot 830. Thus, the same set of VM configuration information 830a is associated with all snapshots 830, 840 of the same family 860.

Suppose that now after taking the 5 snapshots as illustrated in elements 850 and 860 of the FIG. 6, a VM configuration change is made to reduce the number of CPUs from 5 to 2. In accordance with the techniques herein, a $3^{rd}$ generation or family of snapshots may be started as illustrated by element 882 of FIG. 6 including new managed snapshot 6 880 with V3.0 of the VM configuration information 880a. The new managed snapshot 6 880 of the VM 803 may include the VM configuration information 880a indicating that the VM configuration includes 2 CPUs and 2 data VVOLs. The new managed snapshot 880a may include snapshot 6 880b of VVOL1 and snapshot 6 880c of VVOL2.

Consistent with discussion herein, in at least one embodiment the VM configuration information sets 810a, 830a and 880a may (as in the first embodiment described above) be managed and known or visible to the virtualization environment but not managed, known or visible to the data storage system. The data storage system may implicitly rely on the virtualization environment for managing the VM configuration information sets 810a, 830a and 880a. As a variation and consistent with discussion herein in at least one embodiment, the VM configuration information sets 810a, 830a and 880a may (as in the second embodiment described above) be managed and known or visible to the data storage system. The data storage system may explicitly request such VM configuration information sets 810a, 830a and 880a from the virtualization environment and the data storage system may track and manage the VM configuration information sets 810a, 830a and 880a for use with the techniques herein.

Figure 7:
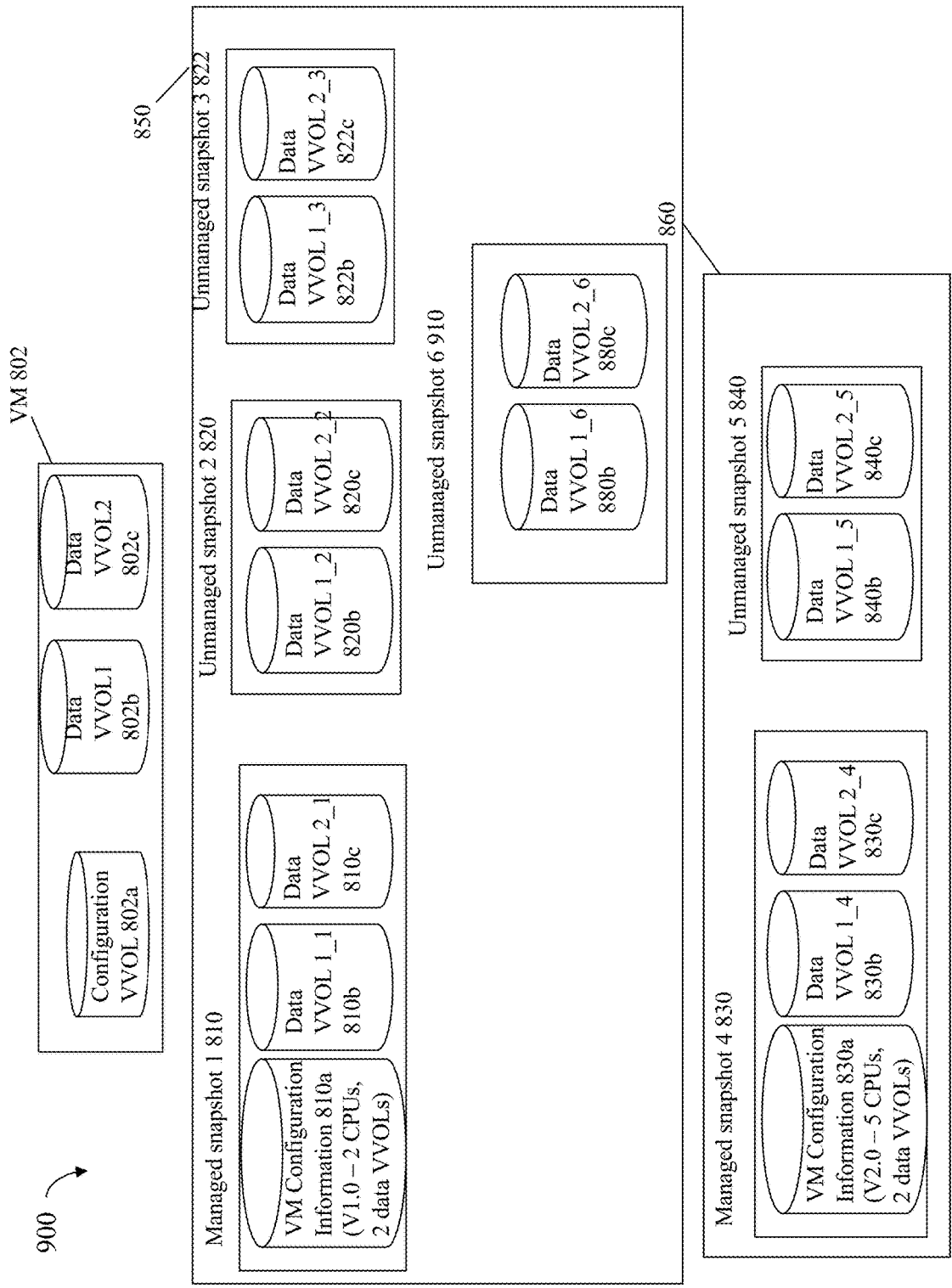

As a further optimization in accordance with the techniques herein, processing may be performed to merge families or generations having matching VM configuration information. In connection with this optimization, the data storage system may explicitly request such VM configuration information sets 810a, 830a and 880a from the virtualization environment and the data storage system may track and manage the VM configuration information sets 810a, 830a and 880a for use with the techniques herein. For example, with reference to the FIG. 6, processing may compare the VM configuration information 880a (V3.0) of the third generation or family 882 to the VM configuration information 810a (V1.0) of the first generation or family 850 and determine that both sets of VM configuration information 810a, and 880a match. In such a case, processing may combine the first family or generation 850 and the third family or generation 882 into a single generation or family as illustrated in FIG. 7. As illustrated with reference to the FIGS. 6 and 7, the managed snapshot 6 880 of FIG. 6 may be converted to the unmanaged snapshot 6 910 of FIG. 7. The unmanaged snapshot 6 910 may be included in the first generation or family 850 whereby the third generation or family 882 of FIG. 6 may be deleted.

Thus, FIG. 7 illustrates the result of the merge processing performed to combine the families 882 and 850 of FIG. 6 into the single family 850 of FIG. 7.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of taking and managing snapshots comprising:
    capturing a first snapshot of a virtual machine (VM), wherein the first snapshot of the VM is a managed snapshot of the VM exposed to a virtualization environment including the VM and wherein the first snapshot of the VM is also exposed to a data storage system environment providing physical storage for data of the VM;
    capturing a second snapshot of the VM, wherein the second snapshot of the VM is a managed snapshot of the VM exposed to the virtualization environment and wherein the second snapshot of the VM is also exposed to the data storage system environment; and
    converting the second snapshot of the VM from a managed snapshot of the VM to an unmanaged snapshot of the VM, wherein subsequent to completing said converting, the second snapshot of the VM that is an unmanaged snapshot is exposed to the data storage system environment and wherein subsequent to completing said converting, the second snapshot of the VM that is an unmanaged snapshot is not exposed to the virtualization environment.

2. The method of claim 1, wherein the first snapshot of the VM uses a first set of VM configuration information describing a current configuration of the VM at a first point in time when capturing the first snapshot of the VM, and wherein the second snapshot of the VM uses a second set of VM configuration information describing a current configuration of the VM at a second point in time when capturing the second snapshot of the VM.

3. The method of claim 2, wherein the first set of VM configuration information and the second set of VM configuration information match.

4. The method of claim 3, further comprising:
receiving a request to restore the VM to the second snapshot of the VM; and
responsive to receiving the request, converting the second snapshot of the VM from an unmanaged snapshot of the VM to a managed snapshot of the VM.

5. The method of claim 4, wherein the VM uses a plurality of virtual volumes (VVOLs) including a first VVOL, wherein the first snapshot of the VM includes a first snapshot of the first VVOL, and wherein the second snapshot of the VM includes a second snapshot of the first VVOL.

6. The method of claim 5, wherein said converting the second snapshot of the VM from an unmanaged snapshot of the VM to a managed snapshot of the VM comprises:
copying the second snapshot of the first VVOL included the second snapshot of the VM to the first snapshot of the first VVOL included in the first snapshot of the VM; and
subsequent to said copying, requesting that the virtualization environment restore the VM from first snapshot of the VM including the second snapshot of the first VVOL.

7. The method of claim 3, wherein the first snapshot of the VM and the second snapshot of the VM are included in a same family or generation of snapshots of the VM, wherein each snapshot of the VM included in the same family or generation of snapshots of the VM uses a same set of VM configuration information.

8. The method of claim 2, wherein the first set of VM configuration information includes information identifying resources allocated for use by the VM at the first point in time when the first snapshot of the VM is captured.

9. The method of claim 8, wherein the second set of VM configuration information includes information identifying resources allocated for use by the VM at the second point in time when the second snapshot of the VM is captured.

10. The method of claim 9, wherein each of the first set of VM configuration information and the second set of VM configuration information includes information identifying at least one of: a number of processors allocated for use by the VM, an amount of memory allocated for use by the VM, a number of VVOLs used by the VM, one or more VVOLs used by the VM, ports or communication connections used by the VM.

11. The method of claim 9, wherein the resources allocated for use by the VM at the first point in time are from a host upon which the VM is running at the first point in time, and wherein the resources allocated for use by the VM at the second point in time are from a host upon which the VM is running at the second point in time.

12. The method of claim 2, wherein the first set of VM configuration information and the second set of VM configuration information do not match.

13. The method of claim 12, further comprising:
receiving a request to restore the VM to the second snapshot of the VM, wherein the second snapshot of the VM is an unmanaged snapshot of the VM;
responsive to receiving the request, converting the second snapshot of the VM from an unmanaged snapshot of the VM to a second managed snapshot of the VM, wherein the second managed snapshot of the VM is exposed to the virtualization environment and the data storage system environment; and
issuing a request to the virtualization environment to restore the VM from the second managed snapshot.

14. The method of claim 2, wherein said converting is performed responsive to determining that a current number of managed snapshots is equal to a maximum number of allowable managed snapshots of the VM, wherein the maximum number is a limitation imposed by the virtualization environment and not a limitation imposed by the data storage system environment.

15. The method of claim 14, further comprising:
receiving, at the data storage system environment from the virtualization environment, the second set of VM configuration information;
storing, in the data storage system environment, the second set of VM configuration information, wherein the second set of VM configuration information is associated with the second snapshot of the VM;
receiving, at the data storage system environment, a request to restore the VM to the second snapshot of the VM when the second snapshot of the VM is an unmanaged snapshot not visible to the virtualization environment;
issuing a request from the data storage system environment to the virtualization environment to instantiate the second snapshot of the VM as a managed snapshot exposed to the virtualization environment; and
issuing a request from the data storage system environment to the virtualization environment to restore the VM from the second snapshot of the VM when the second snapshot is a managed snapshot exposed to the virtualization environment.

16. The method of claim 15, wherein the second snapshot of the VM includes a snapshot of a VVOL used by the VM.

17. The method of claim 16, wherein the request, that is issued from the data storage system environment to the virtualization environment to restore the VM from the second snapshot of the VM, includes the second set of VM configuration information and the snapshot of the VVOL used by the VM.

18. The method of claim 17, wherein the virtualization environment issues a request to the data storage system to create the snapshot of the VVOL used by the VM.

19. A system comprising:
one or more processors; and
a memory comprising code stored thereon that, when executed, performs a method of taking and managing snapshots comprising:
capturing a first snapshot of a virtual machine (VM), wherein the first snapshot of the VM is a managed snapshot of the VM exposed to a virtualization environment including the VM and wherein the first snapshot of the VM is also exposed to a data storage system environment providing physical storage for data of the VM;
capturing a second snapshot of the VM, wherein the second snapshot of the VM is a managed snapshot of the VM exposed to the virtualization environment and wherein the second snapshot of the VM is also exposed to the data storage system environment; and
converting the second snapshot of the VM from a managed snapshot of the VM to an unmanaged snapshot of the VM, wherein subsequent to completing said converting, the second snapshot of the VM that is an unmanaged snapshot is exposed to the data storage system environment and wherein subsequent to completing said converting, the second snapshot of the VM that is an unmanaged snapshot is not exposed to the virtualization environment.

20. A non-transitory computer readable medium comprising code stored thereon that, when executed, performs a method of taking and managing snapshots comprising:
    capturing a first snapshot of a virtual machine (VM), wherein the first snapshot of the VM is a managed snapshot of the VM exposed to a virtualization environment including the VM and wherein the first snapshot of the VM is also exposed to a data storage system environment providing physical storage for data of the VM;
    capturing a second snapshot of the VM, wherein the second snapshot of the VM is a managed snapshot of the VM exposed to the virtualization environment and wherein the second snapshot of the VM is also exposed to the data storage system environment; and
    converting the second snapshot of the VM from a managed snapshot of the VM to an unmanaged snapshot of the VM, wherein subsequent to completing said converting, the second snapshot of the VM that is an unmanaged snapshot is exposed to the data storage system environment and wherein subsequent to completing said converting, the second snapshot of the VM that is an unmanaged snapshot is not exposed to the virtualization environment.

* * * * *